US012794390B1

(12) United States Patent
Perritt, Jr.

(10) Patent No.: US 12,794,390 B1
(45) Date of Patent: Nov. 10, 2026

(54) SYSTEM AND METHOD FOR TRAVERSING CRITICAL SPEEDS IN KINETIC ENERGY STORAGE DEVICES VIA TRANSIENT TORQUE INJECTION

(71) Applicant: Henry Hardy Perritt, Jr., Charlottesville, VA (US)

(72) Inventor: Henry Hardy Perritt, Jr., Charlottesville, VA (US)

( * ) Notice: Subject to any disclaimer, the term of this patent is extended or adjusted under 35 U.S.C. 154(b) by 15 days.

(21) Appl. No.: 19/533,417

(22) Filed: Feb. 9, 2026

(51) Int. Cl.

| | |
|---|---|
| ***H02P 23/04*** | (2006.01) |
| ***F03G 3/08*** | (2006.01) |
| ***H02K 7/02*** | (2006.01) |
| ***H02P 23/00*** | (2016.01) |
| ***H02P 23/20*** | (2016.01) |
| ***H02P 23/30*** | (2016.01) |

(52) U.S. Cl.
CPC ................ *H02P 23/04* (2013.01); *F03G 3/08* (2013.01); *H02K 7/025* (2013.01); *H02P 23/0077* (2013.01); *H02P 23/20* (2016.02); *H02P 23/30* (2016.02)

(58) Field of Classification Search
CPC ...... H02P 23/04; H02P 23/0077; H02P 23/20; H02P 23/30; F03G 3/08; H02K 7/025
See application file for complete search history.

(56) References Cited

U.S. PATENT DOCUMENTS

| | | | | |
|---|---|---|---|---|
| 7,481,132 | B2 | 1/2009 | Mende | |
| 7,518,344 | B2 | 4/2009 | Sihler | |
| 8,669,680 | B2 | 3/2014 | Bradley | |
| 2001/0023785 | A1 | 9/2001 | Geiger | |
| 2020/0228047 | A1 | 7/2020 | Al-Hokayem | |
| 2023/0268784 | A1 * | 8/2023 | Chen ........................ | H02K 3/12 310/216.001 |

FOREIGN PATENT DOCUMENTS

| | | | | |
|---|---|---|---|---|
| EP | 1634368 | B1 | 5/2008 | |
| EP | 2669513 | B1 | 6/2018 | |
| EP | 3380749 | B1 | 10/2019 | |
| WO | WO-2026055086 | A1 * | 3/2026 | ............. H02K 7/025 |

* cited by examiner

*Primary Examiner* — Joseph Ortega
(74) *Attorney, Agent, or Firm* — Harry H. Perritt, Jr.

(57) ABSTRACT

A flywheel energy storage system and method for safely traversing critical speeds without oversizing system components. The system employs a resonance transit mode in which a dedicated, high-discharge auxiliary energy buffer (e.g., supercapacitors or lithium titanate cells) is triggered during the rotor's approach to its natural frequency. A power switching architecture isolates the main power bus and engages the buffer, which injects a transient high-current pulse into the motor-generator, generating a momentary torque spike that accelerates the rotor through the resonance zone faster than the vibration amplitude can build to destructive levels. A transient torque controller implements detection, pre-charge, transit, and recovery states. Smaller, more efficient motor-generators are optimized for steady-state operation rather than for peak transit demands. The system is applicable to renewable energy smoothing applications in which frequent flywheel charge-discharge cycling in response to wind or solar power variability requires repeated traversal of critical speeds.

21 Claims, 8 Drawing Sheets

SYSTEM AND METHOD FOR TRAVERSING CRITICAL SPEEDS IN KINETIC ENERGY STORAGE DEVICES VIA TRANSIENT TORQUE INJECTION

CROSS-REFERENCE TO RELATED APPLICATIONS

Not applicable

STATEMENT REGARDING FEDERALLY SPONSORED RESEARCH OR DEVELOPMENT

Not applicable

THE NAMES OF THE PARTIES TO A JOINT RESEARCH AGREEMENT Not applicable

INCORPORATION-BY-REFERENCE OF MATERIAL

Not applicable

STATEMENT REGARDING PRIOR DISCLOSURES BY THE INVENTOR OR A JOINT INVENTOR

Not applicable

BACKGROUND

Field of the Invention

The present disclosure relates generally to systems and methods for controlling rotating machinery. More particularly, the present disclosure relates to power-electronic and control architectures that reduce time spent traversing one or more resonance regions (including critical rotational speeds) by temporarily increasing available motor torque using a local auxiliary energy source, thereby mitigating vibration growth while accommodating limits of a primary power source.

Background

Many rotating machines exhibit one or more resonance regions in which vibration response increases as rotational speed approaches a natural frequency of the rotor-bearing-support system. Such resonance regions may correspond to one or more “critical speeds,” bending modes, torsional modes, whirl modes, or coupled modes. During acceleration or deceleration through a resonance region, vibration amplitude can increase rapidly, particularly if the machine dwells within the resonance region for an extended time.

In some applications, including kinetic energy storage flywheels, high-speed spindles, centrifuges, turbomachinery, and spacecraft reaction wheels, the rotating assembly may operate above a first critical speed during normal operation. In such cases, run-up from rest to operating speed (and spin-down from operating speed) may require crossing one or more resonance regions. Excessive vibration during such crossings can lead to contact between rotating and stationary components, bearing overload, reduced life, or catastrophic failure.

A practical constraint in many installations is that the primary power source supplying the motor drive may be limited by a continuous power limit. The limitation may be due to an electrical service rating, generator capability, protective device rating, contractual demand limit, thermal limit of power electronics, or software-imposed current limit. As a result, a motor drive system sized for efficient steady-state operation may not provide sufficient transient torque to rapidly traverse a resonance region under all conditions.

Conventional approaches to resonance traversal may include oversizing motors and power electronics to provide higher peak torque, employing active damping or stiffness modification to suppress vibration during traversal, or imposing conservative acceleration profiles that reduce mechanical stress but may increase resonance dwell time. Such approaches can increase cost, weight, complexity, and losses, and may still be sensitive to changes in resonance characteristics over time due to temperature, wear, or operating environment.

One conventional approach to resonance traversal involves oversizing the motor and associated power electronics to provide sufficient torque for rapid acceleration through resonance regions under all operating conditions. This approach, however, imposes significant penalties in cost, weight, volume, and efficiency. A motor sized for worst-case transient torque demand may operate at a small fraction of its rated capacity during steady-state operation, resulting in poor power factor, reduced efficiency, and increased iron losses. Similarly, power electronic converters sized for peak transient current may exhibit degraded performance at typical operating points, and the additional semiconductor die area, heat sinking, and capacitor bank requirements increase system cost and footprint. In applications where weight and volume are constrained-such as mobile platforms, spacecraft, or installations with limited floor space-oversizing may be impractical or infeasible. Moreover, oversizing the motor drive does not address upstream constraints: if the primary power source (such as a utility service entrance, generator set, or facility distribution system) is limited by protective device ratings, contractual demand limits, or thermal capacity, simply installing a larger motor drive may not provide additional transient capability without also upgrading the upstream infrastructure, further compounding cost and complexity.

Another conventional approach employs active damping or active stiffness modification to suppress vibration amplitude during resonance traversal. Active magnetic bearings, for example, may be controlled to inject damping forces or to shift effective bearing stiffness, thereby reducing peak vibration response or moving critical speeds outside an operating range. While effective in some applications, active damping approaches have significant limitations. First, active damping requires continuous real-time control authority over bearing forces, which may not be available in systems employing passive bearings or in systems where bearing control bandwidth is insufficient to respond to rapid vibration growth. Second, active damping consumes controller bandwidth and actuator capacity that may otherwise be needed for rotor positioning, particularly during transient events when both vibration suppression and position control demands are elevated. Third, active damping is inherently reactive: it responds to vibration that has already developed, rather than preventing the conditions that cause vibration growth. In systems with lightly damped modes or with resonance regions that must be traversed repeatedly, active damping may reduce peak amplitude but cannot eliminate the fundamental issue that extended dwell time within a resonance region permits vibration energy to accumulate. Fourth, active damping effectiveness depends on accurate models of rotor dynamics, which may vary with temperature, wear, vacuum level, and other operating conditions; model mismatch can degrade damping performance or, in some cases, destabilize the system. Finally, active stiffness modification that shifts critical speeds may be effective for avoiding resonance during steady-state operation but does not eliminate the need to traverse resonance regions during run-up and spin-down; it merely relocates the problem.

A further conventional approach involves the use of conservative acceleration profiles that limit motor torque and rate of speed change during resonance traversal. By reducing acceleration, vibration growth rate may be reduced, and peak amplitudes may be kept within acceptable limits provided that sufficient time is allowed for the system to traverse each resonance region. Conservative acceleration profiles, however, increase total dwell time within resonance regions, which is counterproductive when the objective is to minimize cumulative vibration exposure. Extended dwell time permits vibration amplitude to build toward steady-state resonant response, which may exceed bearing clearance or fatigue limits even if instantaneous growth rate is low. In applications requiring frequent run-up and spin-down cycles-such as flywheel energy storage systems responding to grid frequency regulation signals-conservative acceleration profiles reduce system responsiveness and throughput. Furthermore, conservative profiles may be inadequate when resonance characteristics shift due to thermal expansion, bearing wear, or changes in vacuum level; a profile designed for nominal conditions may become unsafe under off-nominal conditions, yet an excessively conservative profile designed for worst-case conditions imposes unnecessary performance penalties under nominal operation.

Passive damping treatments, such as viscoelastic layers, squeeze-film dampers, or tuned mass dampers, may reduce peak vibration amplitude during resonance traversal. Passive damping, however, introduces trade-offs in system complexity, weight, maintenance, and performance. Viscoelastic materials exhibit temperature-dependent properties and may degrade over time, particularly in vacuum environments where outgassing is a concern. Squeeze-film dampers require fluid management and may introduce additional failure modes. Tuned mass dampers are effective only within a narrow frequency range and may be inadequate when critical speeds shift due to operating condition changes. Structural modifications that raise or lower critical speeds-such as stiffening the rotor or support structure—may relocate resonance regions but do not eliminate them; the rotor must still traverse one or more resonance regions during run-up unless the operating speed range is restricted to remain below the first critical speed, which limits energy storage capacity and system utility.

Soft-start techniques and current-limiting approaches that gradually ramp motor current during run-up are effective for reducing inrush current and mechanical shock but do not address the resonance traversal problem. By limiting current, soft-start approaches necessarily limit available torque, which extends the time required to accelerate through resonance regions. While soft-start may be appropriate for applications where resonance traversal is not a concern, it is counterproductive in applications requiring rapid traversal to limit vibration growth. Some motor drive systems include torque-boost features intended to provide elevated torque during acceleration, but such features are typically limited by the continuous or short-term overload ratings of the power electronics and by the capacity of the upstream power source; they do not provide a means to exceed these limits when the upstream power source is constrained.

Underlying the conventional approaches described above is a fundamental engineering philosophy: that critical transient operations demand maximum resource availability, and that power system design should ensure access to all available power sources during periods of elevated stress. This philosophy leads practitioners to address resonance traversal challenges by increasing the capacity of primary power infrastructure, adding redundant power paths, or designing control strategies that maintain connection to primary power sources while supplementing with auxiliary sources in parallel. The notion of deliberately reducing power source availability during a critical transient-such as by isolating a primary power bus-runs contrary to this established philosophy. A practitioner seeking to improve resonance traversal performance would naturally pursue approaches that increase total available power during the transient, rather than approaches that disconnect existing power sources. This philosophical orientation, combined with legitimate concerns regarding failure modes, DC link stability, protection coordination, and switching stress during high-current transients, has directed the art toward the oversizing, active damping, and conservative profiling approaches described above, notwithstanding their significant limitations.

In view of the foregoing limitations, a need exists for systems and methods that enable rapid traversal of resonance regions without requiring oversized motors, permitting a primary motor drive and power source to be sized for efficient steady-state operation rather than worst-case transient torque demand. A need exists for power electronics, or upstream power infrastructure; without relying solely on active damping that is reactive and model-dependent; and without imposing conservative acceleration profiles that increase dwell time and reduce system responsiveness. In particular, a need exists for approaches that decouple transient torque capability during resonance traversal from the continuous power rating of the primary power source, thereby permitting system components to be sized for efficient steady-state operation while still providing sufficient transient capability for safe and rapid resonance traversal under a range of operating conditions.

BRIEF SUMMARY

This application discloses systems and methods for traversing one or more resonance regions of a rotating machine by temporarily increasing motor torque using energy supplied from an auxiliary energy buffer when a resonant frequency is approached. In some embodiments comprising a kinetic energy storage system, a motor drive is operated subject to a primary power limitation during normal operation, and a controller selectively provides additional electrical power from the auxiliary energy buffer to the motor drive during at least a portion of a resonance traversal event. By increasing torque and/or acceleration during resonance traversal, the rotating assembly may pass through a resonance region with reduced dwell time, thereby reducing vibration growth.

In some embodiments, the rotating machine comprises a kinetic energy storage flywheel including a rotor coupled to a motor/generator driven by a variable frequency drive. The disclosed principles, however, are not limited to flywheels and may be applied to other rotating machinery required to cross resonance regions during acceleration and/or deceleration.

The auxiliary energy buffer may comprise, for example, a supercapacitor bank, a high-rate battery chemistry, a hybrid capacitor-battery system, or other energy storage device capable of providing transient electrical power. In some embodiments, the auxiliary energy buffer is sized to provide power for a short duration relative to a thermal time constant of the motor and/or power electronics, such that the motor and/or inverter may safely provide peak torque for the traversal event without being sized for continuous delivery of such peak torque.

The auxiliary energy buffer may be coupled to the motor drive in various ways. In some embodiments, a coupling arrangement includes one or more switches configured to connect the auxiliary energy buffer selectively to a DC link of the motor drive. In some embodiments, the coupling arrangement further includes a switch configured to isolate a primary power path during at least a portion of the traversal event. In other embodiments, the primary power path remains connected while current drawn from the primary power source is limited to a predetermined value and the auxiliary energy buffer supplies additional power. In still other embodiments, coupling is performed through a bidirectional DC/DC converter, an auxiliary inverter, or another controlled power conversion stage that regulates energy exchange between the auxiliary energy buffer and the motor drive.

Initiation of a resonance traversal event may be triggered based on one or more measured or estimated parameters, including rotational speed, a stored resonance map, vibration amplitude, vibration growth rate, spectral content of vibration, motor current signatures, bearing controller effort, or a resonance risk metric derived from one or more such parameters. The controller may terminate the traversal event based on detection of having exited a resonance region, a decrease in vibration response, an elapsed time, a minimum auxiliary energy buffer voltage or state of charge, or other safety criteria.

In some embodiments, the controller implements a state machine including states such as pre-charge, monitor, traversal, and recovery. In recovery, the auxiliary energy buffer may be recharged from the primary power source and/or from regenerative energy during deceleration, through regenerative braking, thereby maintaining readiness for future resonance traversal events.

Beyond the resonance traversal capabilities described herein, the disclosed system is particularly advantageous for smoothing intermittent power fluctuations from renewable energy sources, such as wind and solar. By enabling the use of a motor drive and primary power connection sized for efficient steady-state operation rather than peak transient demand, the system can effectively absorb and inject power to stabilize the grid during variable generation conditions. Once the rotor has safely traversed the critical speeds using the auxiliary energy buffer, the system operates in a high-efficiency steady state where it can continuously regulate the DC bus or grid connection, absorbing excess energy during generation peaks and discharging energy during lulls, thereby mitigating the volatility inherent in renewable power generation.

These and other features of the present disclosure will be apparent from the following detailed description and the accompanying drawings.

TERMS AND DEFINITIONS

As used herein, the following terms have the meanings set forth below. These definitions are provided to aid clarity and are not intended to limit the scope of the claims.

"Rotating machine" or "rotating system" includes any apparatus having a rotating body driven by a motor, including without limitation a kinetic energy storage flywheel, centrifuge, turbomachine, compressor, pump, machine-tool spindle, gyroscope, reaction wheel, or other rotating assembly.

"Rotating body" includes a rotor, shaft, flywheel mass, impeller, turbine wheel, spindle, armature, or other rotating element driven directly or indirectly by a motor.

"Resonance region" includes a rotational speed range in which vibration response tends to increase due to proximity to a natural frequency or mode of the rotating machine, including bending modes, torsional modes, whirl modes, or coupled modes. A resonance region may encompass one or more critical speeds, defined by critical speed thresholds.

"Critical speed" refers to a rotational speed associated with an increased vibration response due to a resonance condition. A rotating machine may have multiple critical speeds.

"Resonance traversal" refers to accelerating and/or decelerating through a resonance region. "Dwell time" refers to time spent within a defined resonance region.

"Primary power source" refers to a power source supplying a motor drive during normal operation, including a utility grid connection, generator set, UPS, DC bus, battery system, renewable source, or other source.

"Primary power limitation" includes a limit on current, power, or energy drawn from the primary power source, whether imposed by electrical service rating, protective devices, transformer limits, generator capacity, thermal limits of power electronics, or software-imposed limits.

"Auxiliary energy source" or "auxiliary energy buffer" refers to an energy storage device or local energy source configured to provide electrical power to the motor drive for at least a portion of a resonance traversal event. The auxiliary energy buffer may include one or more of supercapacitors, capacitors, batteries, hybrid capacitor-battery systems, or other storage technologies, and may include associated power conversion and protection circuitry.

"Coupled" or "coupling" refers to electrical connection or controlled energy exchange between components, including direct connection, switched connection, regulated connection via DC/DC conversion, regulated connection via AC/DC conversion, or combinations thereof.

"Motor drive" includes a variable frequency drive, inverter, active front end, rectifier, DC link, and/or associated control and protection circuitry configured to supply controlled electrical power to a motor.

"Torque boost" or "transient torque injection" refers to commanding and delivering increased motor torque relative to a baseline limited by the primary power limitation, including by supplying additional power from the auxiliary energy buffer.

"Resonance risk metric" refers to a computed value derived from one or more measured or estimated parameters indicative of resonance proximity or vibration growth potential.

"Transient torque controller" is one embodiment of a "controller."

BRIEF DESCRIPTION OF THE SEVERAL VIEWS OF THE DRAWINGS

To identify the discussion of any particular element or act easily, the most significant digit or digits in a reference number refer to the figure number in which that element is first introduced.

DETAILED DESCRIPTION

The following description presents preferred embodiments of the invention. It should be understood that the invention may be practiced with modifications and alterations, and that the invention is limited only by the claims.

Overview

The embodiments described herein provide a power and control architecture that enables a rotating machine to traverse one or more resonance regions with reduced dwell time by temporarily increasing available motor torque using an auxiliary energy buffer. In a typical implementation, a motor drive receives power from a primary power source subject to a primary power limitation during normal operation. A controller determines when a resonance traversal event is imminent or occurring, and for at least a portion of the traversal event causes additional electrical power to be delivered from the auxiliary energy buffer to the motor drive so that motor torque and/or acceleration increases relative to operation limited by the primary power source and its continuous power limit.

In some embodiments, the rotating machine is a flywheel energy storage system. In other embodiments, the rotating machine is another motor-driven rotating assembly required to cross resonance regions during acceleration and/or deceleration.

Hardware Configuration

Figure 1:
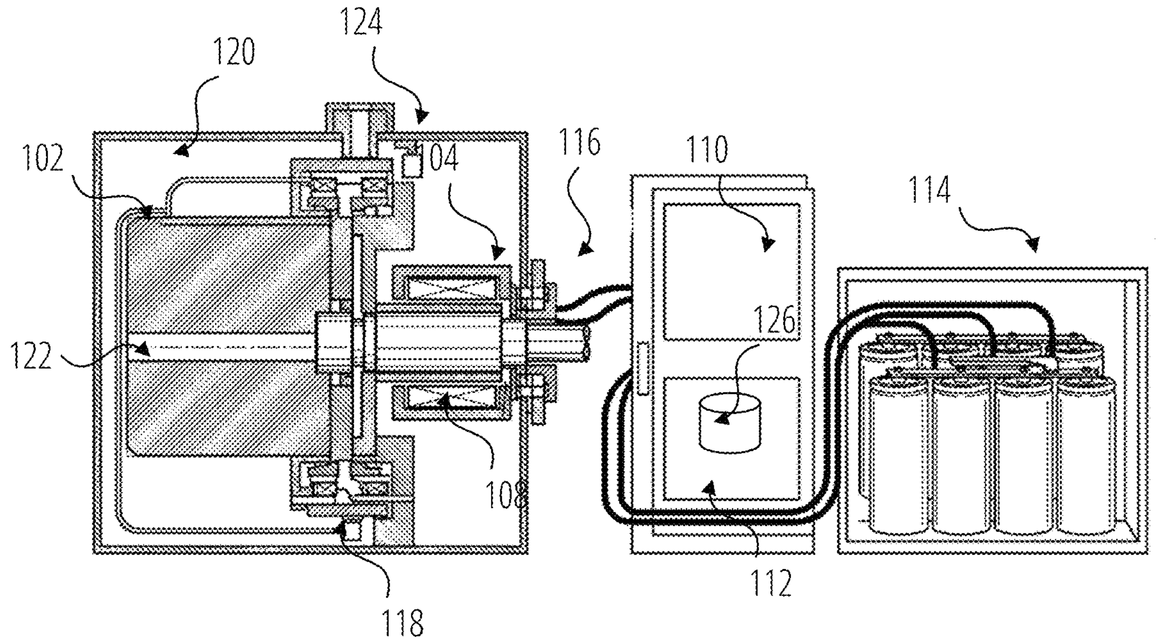
FIG. 1 is a diagrammatic cross-sectional view illustrating the physical hardware configuration of the flywheel energy storage system according to a preferred embodiment of the present invention.

FIG. 1 is a diagrammatic cross-sectional view illustrating the physical hardware configuration of one embodiment of the kinetic energy storage system—a flywheel energy storage system. This figure depicts the arrangement of the mechanical rotating assembly and its connection to the associated power electronics and the novel auxiliary energy buffer subsystem.

The system comprises a flywheel rotor 102, a rotating shaft 122, a motor stator 104, a motor armature 108, and vibration sensors 116, collectively comprising a mechanical flywheel unit, housed within a sealed vacuum chamber 120. The system also comprises a variable frequency drive 110, a transient torque controller 112 with a memory 126, and an auxiliary energy buffer 114.

The flywheel rotor 102 and rotating shaft 122 have a mass and a stiffness defining at least one critical rotational speed.

The sealed vacuum chamber 120 maintains a low-pressure environment to minimize aerodynamic drag on the rotating components. Inside the chamber, a high-inertia flywheel rotor 102 is mounted rigidly to a rotating shaft 122. The shaft is rotatably supported for high-speed operation by upper and lower bearing assemblies, depicted here as non-contact magnetic bearings 118, which maintain the radial and axial position of the rotor assembly with minimal friction.

An integrated electric motor/generator is arranged coaxially with the shaft. It comprises a stationary motor stator 104, fixed to the interior structure of the vacuum chamber housing, and a motor armature 108 (such as a permanent magnet assembly) mounted directly onto the rotating shaft 122. This motor/generator handles both the steady-state acceleration/deceleration of the flywheel and the transient high-torque bursts required by the present invention.

To monitor the dynamic state of the rotor, one or more Vibration sensors 116 (e.g., eddy current displacement probes or accelerometers) are mounted to the stationary housing in close proximity to the rotating shaft 122. These sensors provide real-time feedback regarding shaft deviation and resonant amplitude buildup to the control system.

A main controls cabinet houses the primary power electronics, specifically the variable frequency drive 110 (VFD). The VFD is electrically connected through the vacuum chamber wall to the motor stator 104 to control the speed and torque of the flywheel. Residing within or logically coupled to the VFD hardware is the transient torque controller 112, which executes the specialized control logic for critical speed transit.

On the right side of the figure is a separate enclosure housing the auxiliary energy buffer 114. As illustrated, this buffer consists of a bank of high-discharge storage devices, depicted here as interconnected cylindrical supercapacitors. High-current electrical cabling connects this auxiliary energy buffer 114 to the VFD 110. This dedicated connection allows the transient torque controller 112 to draw a rapid, high-power pulse from the supercapacitor bank to overdrive the motor stator 104 during the resonance transit phase, independent of the main grid supply limitations.

System Architecture

Figure 2:
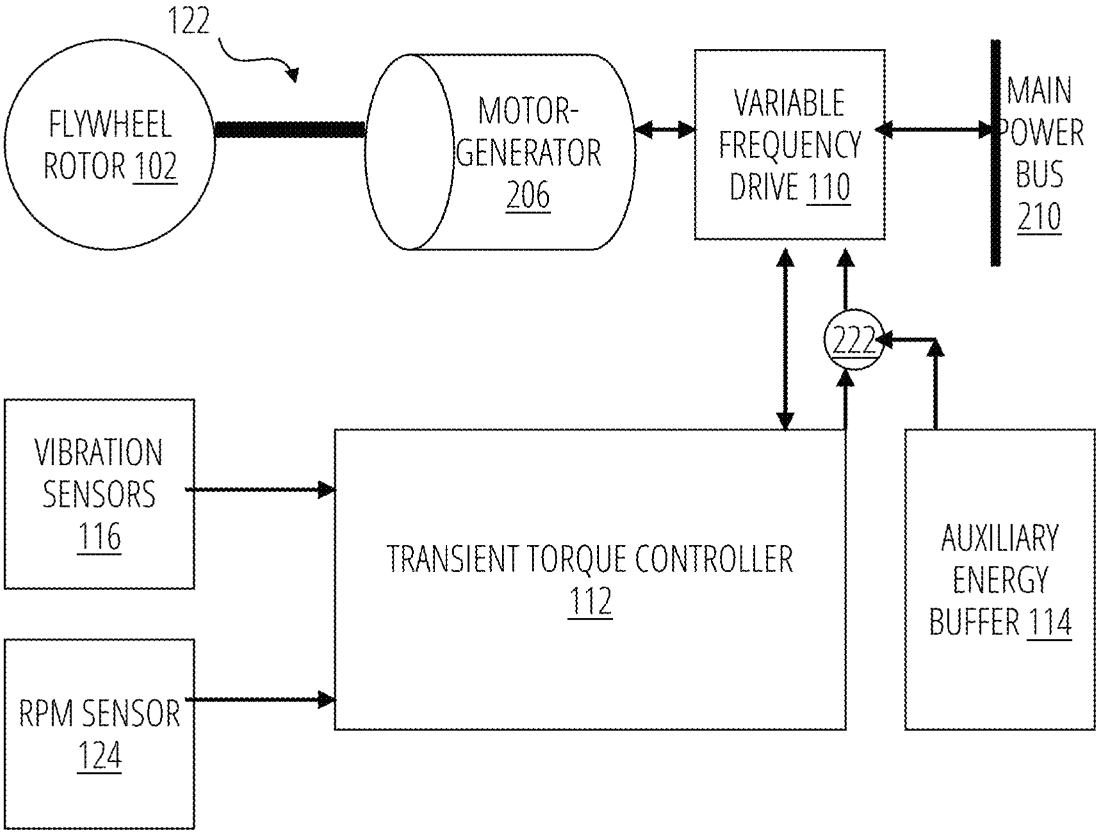
FIG. 2 is a block diagram of the flywheel energy storage system showing the main power bus, auxiliary energy buffer, power switching elements, and control architecture.

Referring to FIG. 2, the system comprises a flywheel rotor 102 magnetically or mechanically coupled to a motor-generator 206. The motor-generator 206 is electrically connected to a variable frequency drive 110 (VFD), which manages power flow to and from a main power bus 210.

The main power bus 210 is configured to supply electrical current to the variable frequency drive 110 up to a first maximum current rating.

The coordination of the transient torque controller 112, the auxiliary energy buffer 114, the main bus isolation switch 606, the buffer engagement switch 612, vibration sensor 618, open main bus isolation switch 316, and RPM sensors 124 define a preferred embodiment.

Auxiliary Energy Buffer

The auxiliary energy buffer 114 is a high-power-density storage medium capable of discharging its entire capacity in under 10 seconds. In various embodiments, the auxiliary energy buffer 114 may comprise:

(a) An ultracapacitor or supercapacitor bank, preferably rated for capacitance selected to store sufficient energy for the transit event, typically 0.1-10 Farads at pack voltage (e.g., 400-800V);

(b) Lithium titanate (LTO) battery cells, which offer high discharge rates (up to 301 continuous, 20C pulsed) with excellent cycle life;

(c) Lithium iron phosphate (LFP) cells configured for high-rate discharge;

(d) A hybrid system combining supercapacitors for initial high-current burst with battery cells for sustained power; or (e) A secondary flywheel optimized for high power output rather than energy storage.

The auxiliary energy buffer 114 is sized such that its maximum discharge current rating exceeds the continuous current rating of the main power input by a factor of at least 2:1, and preferably in the range of 3:1 to 10:1. This ratio is termed the boost ratio.

The auxiliary energy buffer is configured to provide transient electrical power to the motor drive during at least a portion of a resonance traversal event. In various embodiments, the auxiliary energy buffer comprises one or more of: supercapacitors, such as in a supercapacitor bank, a capacitor bank, a high-rate battery chemistry comprising battery cells (including without limitation lithium titanate battery cells or lithium iron phosphate battery cells), a hybrid capacitor-battery system, or another energy storage technology capable of providing transient electrical power at a rate sufficient to achieve a target dwell time through a resonance region. In some embodiments, the auxiliary energy buffer 114 comprises a hybrid storage system including both supercapacitors and battery cells.

In some embodiments, the auxiliary energy buffer is characterized by one or more of: (i) a maximum discharge current, (ii) a maximum discharge power, (iii) an energy capacity sufficient for a boost duration, and (iv) an internal resistance or equivalent series resistance (ESR) suitable for high-power discharge. In some embodiments, a ratio of a maximum auxiliary contribution (current and/or power) to a maximum contribution available from the primary power source under the primary power limitation is referred to as a "boost ratio." The boost ratio may be expressed in terms of current, power, torque, or another measure of incremental capability.

In some embodiments, a second maximum discharge current rating is twice the first maximum discharge current rating.

The auxiliary energy buffer may be sized based on one or more parameters including resonance region width, desired dwell time, rotor inertia, expected torque demand, motor efficiency, and permitted voltage droop on the DC link. In embodiments employing a DC/DC converter, the auxiliary energy buffer voltage range may be decoupled from DC link voltage, thereby expanding permissible auxiliary energy buffer configurations and improving controllability of charge and discharge.

Transient Torque Controller

In one embodiment a transient torque controller 112 is configured: (i) to open the main bus isolation switch 606 and close the buffer engagement switch 612 when the rotational speed of the flywheel rotor is within a predetermined range encompassing the critical rotational speed, thereby causing the auxiliary energy buffer 114 to discharge current into the variable frequency drive 110; and (ii) to close the main bus isolation switch 606 and to open the buffer engagement switch 612 after the rotational speed of the flywheel rotor exceeds an upper bound of the predetermined range.

Power Coupling Architectures

The auxiliary energy buffer may be coupled to the motor drive using any architecture that enables delivery of additional electrical power during a resonance traversal event. Non-limiting examples include the following.

(A) Switched DC-link coupling with optional primary path isolation. In some embodiments, the auxiliary energy buffer is selectively connected to a DC link of the motor drive through a controllable switching arrangement. In one embodiment, during at least a portion of the resonance traversal event, a switch in a primary power path is opened to reduce reverse current flow and/or to prevent the primary power source from being subjected to transient currents associated with the traversal event, and a switch connecting the auxiliary energy buffer is closed to supply additional power to the motor drive.

(B) Parallel supplementation without isolation. In some embodiments, the primary power path remains connected during the resonance traversal event while the auxiliary energy buffer is engaged in parallel with the primary power source. In such embodiments, the auxiliary energy buffer supplies at least a portion of incremental power required to achieve a target acceleration through the resonance region, while the primary power source continues to supply current within its permitted limit.

(C) Primary-source current limiting with auxiliary supplementation. In some embodiments, rather than opening an isolation switch, the motor drive includes an input stage (e.g., a rectifier, active front end, or DC/DC stage) that is controlled to limit current drawn from the primary power source to a predetermined value during resonance traversal. The auxiliary energy buffer supplies additional power such that motor current and/or commanded torque exceeds what would be achievable under the primary power limitation alone. This embodiment may reduce mechanical and electrical transients associated with opening and closing an isolation switch.

DC/DC-Coupled Auxiliary Energy Buffer

In some embodiments, the auxiliary energy buffer is connected to the DC link through a bidirectional DC/DC converter. The DC/DC converter may regulate charge and discharge current, decouple auxiliary energy buffer voltage from DC link voltage, enable controlled torque-boost profiles, and manage recharge of the auxiliary energy buffer following a traversal event.

(E) AC-coupled or auxiliary inverter injection. In some embodiments, an auxiliary inverter or power converter injects power to an AC input of the motor drive or directly into a DC link. In such embodiments, the auxiliary energy buffer may be electrically isolated from the primary power source while still providing controlled power injection during resonance traversal.

The above architectures may be used individually or in combination, and physical integration may vary. For example, the auxiliary energy buffer may be packaged as a module integrated within a motor drive enclosure or located remotely and connected by high-current conductors.

In some embodiments, the controller is further configured to close the main bus isolation switch if the voltage of the auxiliary energy buffer falls below a minimum threshold during discharge, thereby supplementing power from the main power bus.

Figure 8:
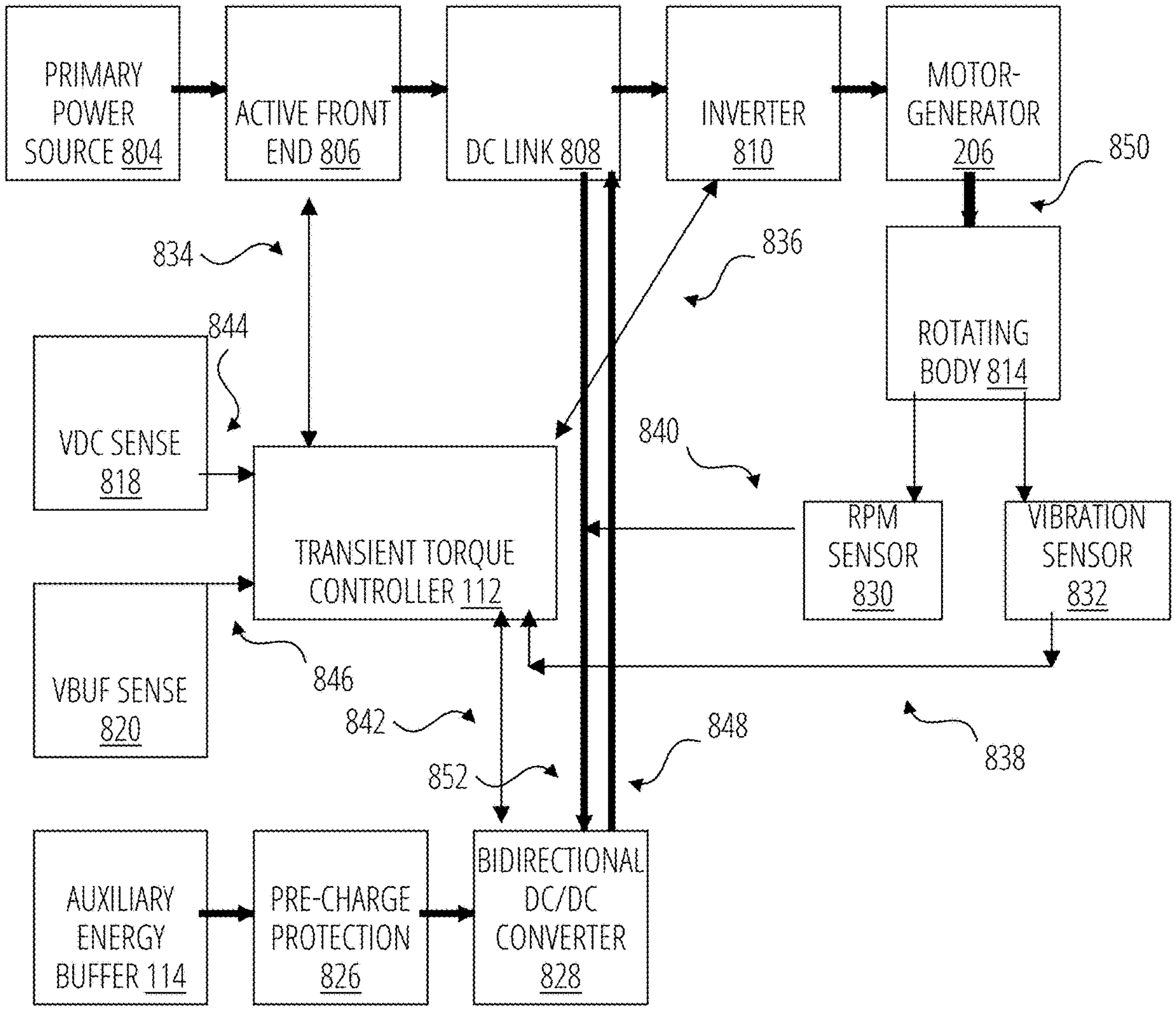
FIG. 8 is a block diagram of a flywheel energy storage system including a bidirectional DC/DC converter coupling an auxiliary energy buffer to a motor drive DC link for controlled discharge during resonance traversal and controlled recharge from a primary power source and/or regenerative energy.

In addition to embodiments employing direct switched coupling of the auxiliary energy buffer to the DC link (e.g., via an engagement switch and optional isolation switch), the system may employ a regulated coupling stage that controls charge and discharge of the buffer. FIG. 8 illustrates one such embodiment employing a bidirectional DC/DC converter between the auxiliary energy buffer and the DC link.

Control Algorithm

Figure 3:
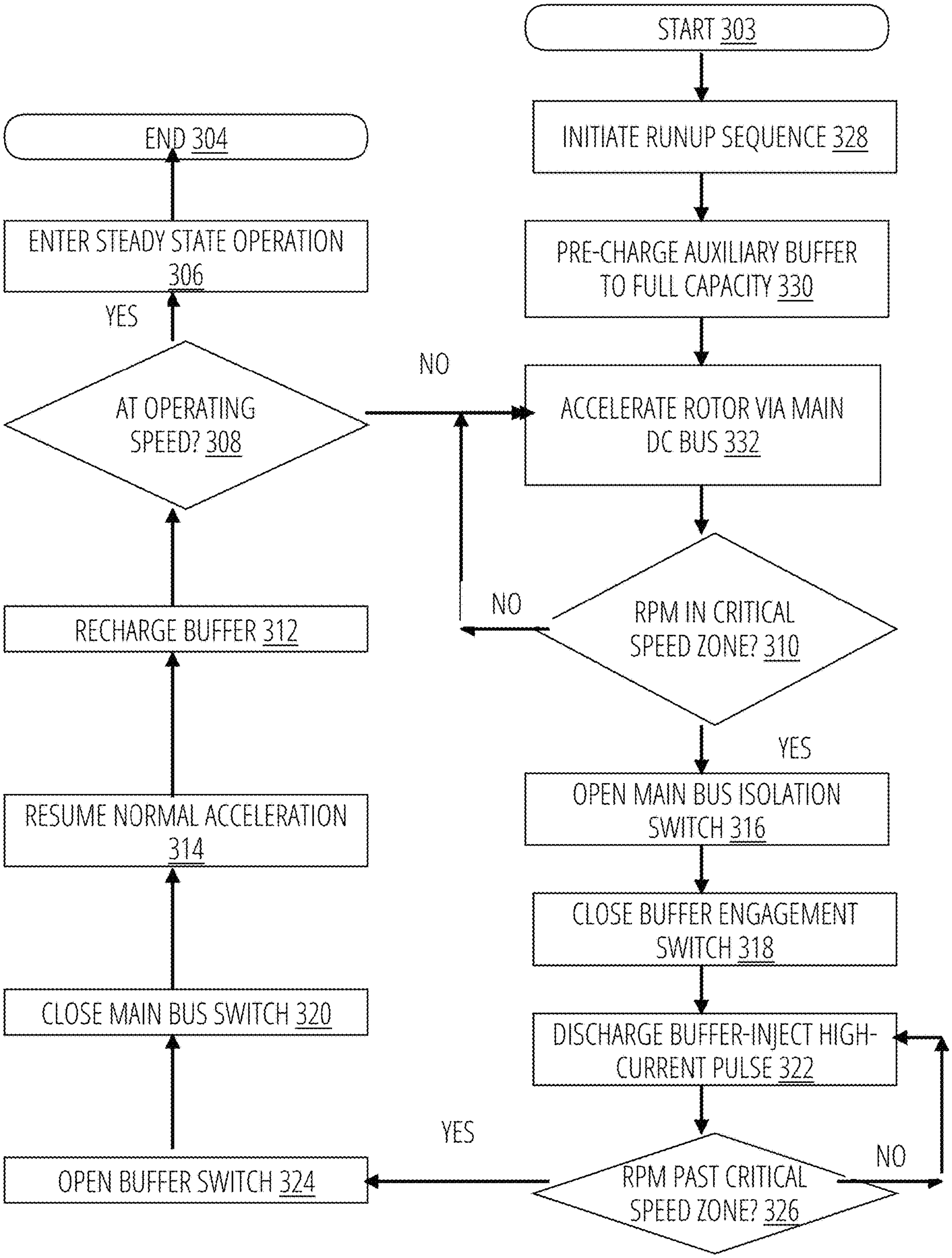
FIG. 3 is a logic flow chart illustrating the control method for the resonance transit mode, including state transitions and decision logic.

FIG. 3 is a flow chart for the resonance transit mode control method, showing the sequence from run-up initiation through pre-charge, acceleration, detection of critical speed zone entry, switch operations, high-current discharge, and recovery with buffer recharge for subsequent critical speeds. Critical speed zone entry is determined by crossing a critical speed threshold. FIG. 3 illustrates an example routine. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

Figure 6:
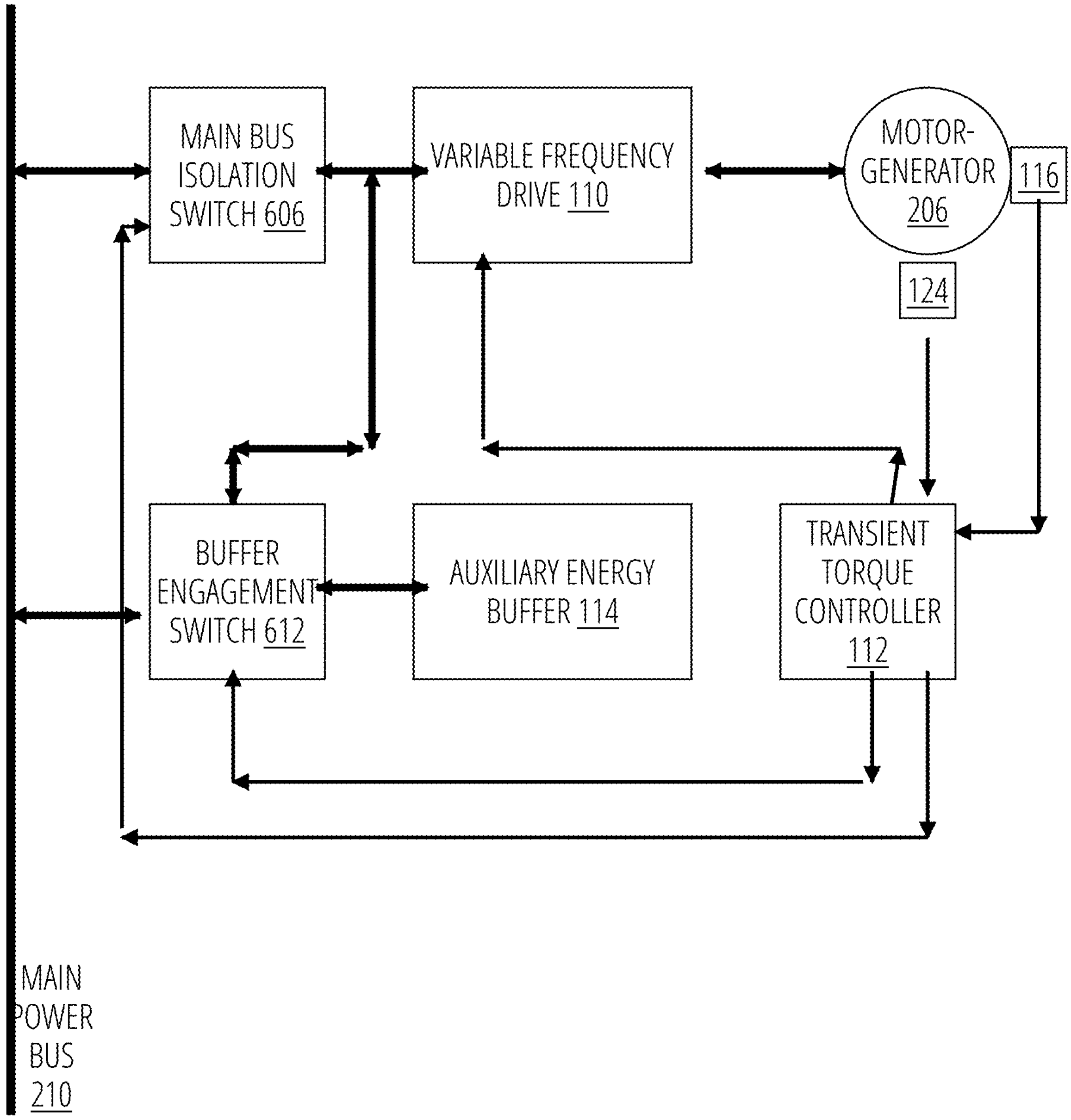
FIG. 6 is a schematic diagram of the power switching circuit showing the main bus isolation switch, buffer engagement switch, and associated protection circuitry.

Referring to FIGS. 2 and 6, the transient torque controller 112 implements a state machine with the following steps: start 303, end 304, enter steady state operation 306, operating speed? 308, RPM in critical speed zone? 310, recharge buffer 312, resume normal acceleration 314, open main bus isolation switch 316, close buffer engagement switch 318, close main bus switch 320, discharge buffer-inject high-current pulse 322, open buffer switch 324, and RPM past critical speed zone? 326.

The system comprises an initiate runup sequence 328, a pre-charge auxiliary buffer to full capacity 330, and an accelerate rotor via main DC bus 332.

Handling Multiple Critical Speeds

Most rotors exhibit multiple bending modes, each associated with a distinct critical speed. In one embodiment, the transient torque controller 112 stores a table of critical speed values (e.g., first, second, and third critical speeds) determined during commissioning. During run-up, the controller monitors for approach to each critical speed in sequence and initiates resonance transit mode for each. Between critical speeds, the auxiliary energy buffer 114 is recharged via the main bus or, alternatively, via regenerative energy capture during brief deceleration events.

Regenerative Charging

In a preferred embodiment, the auxiliary energy buffer 114 is recharged via regenerative braking during rotor deceleration (spin-down) events. When the flywheel system is called upon to discharge energy to the grid, the controller directs a portion of the regenerated current to the auxiliary energy buffer 114 until it reaches full charge. This ensures the buffer is always prepared for a subsequent run-up event without drawing additional power from the grid.

Motor Thermal Considerations

The motor-generator 206 has a first maximum current rating (Icont) and a second maximum current rating (Ipeak). The second maximum current rating is between three and ten times the first maximum current rating. The motor-generator 206 is selected such that its thermal time constant (the time required for winding temperature to reach 63% of its final value under constant current) is greater than the expected transit duration. In a preferred embodiment, the motor thermal time constant is at least 15 seconds, and preferably at least 30 seconds. This allows the motor to sustain currents exceeding its continuous rating—its first maximum current rating—by a factor of 3-10 for the duration of the transit (typically less than 2 seconds) without exceeding safe rated winding temperatures at the second maximum current rating.

The relationship between motor continuous current rating Icont, peak transit current Ipeak, thermal time constant $\tau$, and transit duration ttransit is governed by the motor's thermal model. For safe operation: $\mathrm{Ipeak} \leq \mathrm{Icont} \times \sqrt{(\tau/\mathrm{ttransit})}$.

Variable Frequency Drive Topology

The variable frequency drive 110 preferably comprises an H-bridge or three-phase inverter topology using insulated gate bipolar transistors (IGBTs) or silicon carbide (SiC) MOSFETs. The inverter is rated for pulsed operation at 150-200% of its continuous current rating for durations up to 10 seconds. Snubber circuits and fast-acting fuses protect against transient overvoltage and overcurrent conditions during the high-power transit event.

Failure Mode Handling

The system includes provisions for safe handling of component failures:

Buffer Depletion During Transit: If the auxiliary energy buffer 114 voltage falls below a minimum threshold during TRANSIT state before the rotor clears the critical speed zone, the controller immediately closes the main bus isolation switch 606 to supplement power from the main bus, accepting the risk of main bus overcurrent in preference to rotor damage.

Switch Failure: Redundant switching paths may be provided. In one embodiment, the system includes a bypass contactor that closes if the primary isolation switch fails to open.

Vibration Exceeds Maximum: If vibration amplitude exceeds a maximum safe threshold (e.g., 80% of bearing clearance) during transit, the controller initiates an emergency spin-down sequence rather than continuing acceleration.

Main Bus Isolation

In some embodiments, the main bus isolation switch is opened during at least a portion of the resonance traversal event. While isolating the primary power source during a critical transient may appear counterintuitive—as conventional practice favors maintaining access to all available power sources during high-stress operations—the inventor recognizes that the main bus current limitation itself constrains transient performance. When the auxiliary energy buffer is engaged in parallel with a connected main bus, the motor drive cannot command current exceeding the main bus limit without risking upstream protection trips or reverse current flow toward the main bus. By isolating the main bus, the controller permits the motor drive to draw current from the auxiliary energy buffer without regard to the main bus limitation, thereby achieving transient torque capability that would be unattainable with the main bus connected. This approach permits the primary power source, upstream distribution equipment, and protective devices to be sized for efficient steady-state operation rather than worst-case transient demand, while the auxiliary energy buffer—sized specifically for short-duration, high-current discharge—provides transient capability exceeding what the primary power infrastructure could deliver.

Worked Example

The following example illustrates the sizing of system components for a representative flywheel energy storage application:

Given Parameters:

Rotor mass: 100 kg

Rotor moment of inertia (J): 2.5 kg·m$^2$

First critical speed: 2,200 RPM (230 rad/s)

Critical speed bandwidth (resonance zone): 2,000-2,400 RPM

Target transit time through resonance zone: 1.2 seconds

Main bus voltage: 600 V DC

Main bus continuous current limit: 50 A

Calculations:

Required angular acceleration: $\Delta\omega/\Delta t=(251-209\text{ rad/s})/1.2\text{ s}=35\text{ rad/s}^2$ Required torque (without resonance drag): $T=J\times\alpha=2.5\times35=87.5$ N·m Resonance drag torque (empirical, typically 50-100% of acceleration torque): ~60 N·m Total required torque: 87.5+60=147.5 N·m Required motor power at 2,200 RPM: $P=T\times\omega=147.5\times230=33.9$ kW Required motor current at 600 V: $I=P/V=33{,}900/600=56.5$ A (accounting for efficiency losses, ~65 A)

Main bus shortfall: 65 A−50 A=15 A (Buffer must supply at least this differential; safety margin suggests 30+A)

Buffer Sizing:

Buffer current contribution: 40 A (providing margin)

Transit duration: 1.2 seconds

Energy required from buffer: $E=V\times I\times t=600\times40\times1.2=28.8$ kJ

For supercapacitor (assuming 50% usable voltage range, 600 V to 300 V): $E=0.5\times C\times(V_1^2-V_2^2)$ Required capacitance: C=0.21 Farads.

Selected buffer: 0.25 F (achieved with 50F cells in a 222-series configuration)

Result: With this configuration, the system achieves transit through the critical speed zone in 1.2 seconds with a boost ratio of approximately 1.8:1 (90 A total vs. 50 A main bus limit). The motor can be sized for 30 kW steady-state operation rather than the 50+kW that would otherwise be required for safe resonance traversal.

In renewable energy smoothing applications, the kinetic energy storage system may be operatively coupled to a wind turbine, a photovoltaic array, or a hybrid renewable generation facility. During normal operation, a supervisory controller or energy management system commands the flywheel to accelerate (absorbing excess generation) or decelerate (injecting stored energy into the grid or a local bus) in response to measured or predicted fluctuations in renewable power output. Such fluctuations may include short-duration variability caused by wind gusts, cloud transients, or turbine cut-in and cut-out events, as well as longer-duration ramp events associated with weather fronts or diurnal solar cycles. In these applications, the flywheel rotor may cycle between partial and full operating speed many times per operating day, with each acceleration and deceleration potentially requiring traversal of one or more critical speeds. The transient torque controller 112 and auxiliary energy buffer 114 disclosed herein ensure that each such traversal is completed rapidly, limiting vibration amplitude below bearing clearance thresholds regardless of cycling frequency. The auxiliary energy buffer 114 may be recharged between successive traversals using power from the main power bus 210, from regenerative braking energy captured during flywheel deceleration, or from a combination thereof, as described above. In some embodiments, the supervisory controller coordinates the timing of flywheel charge and discharge commands with the state of charge of the auxiliary energy buffer 114 to ensure that the buffer is adequately charged before each anticipated resonance traversal.

Figure 4:
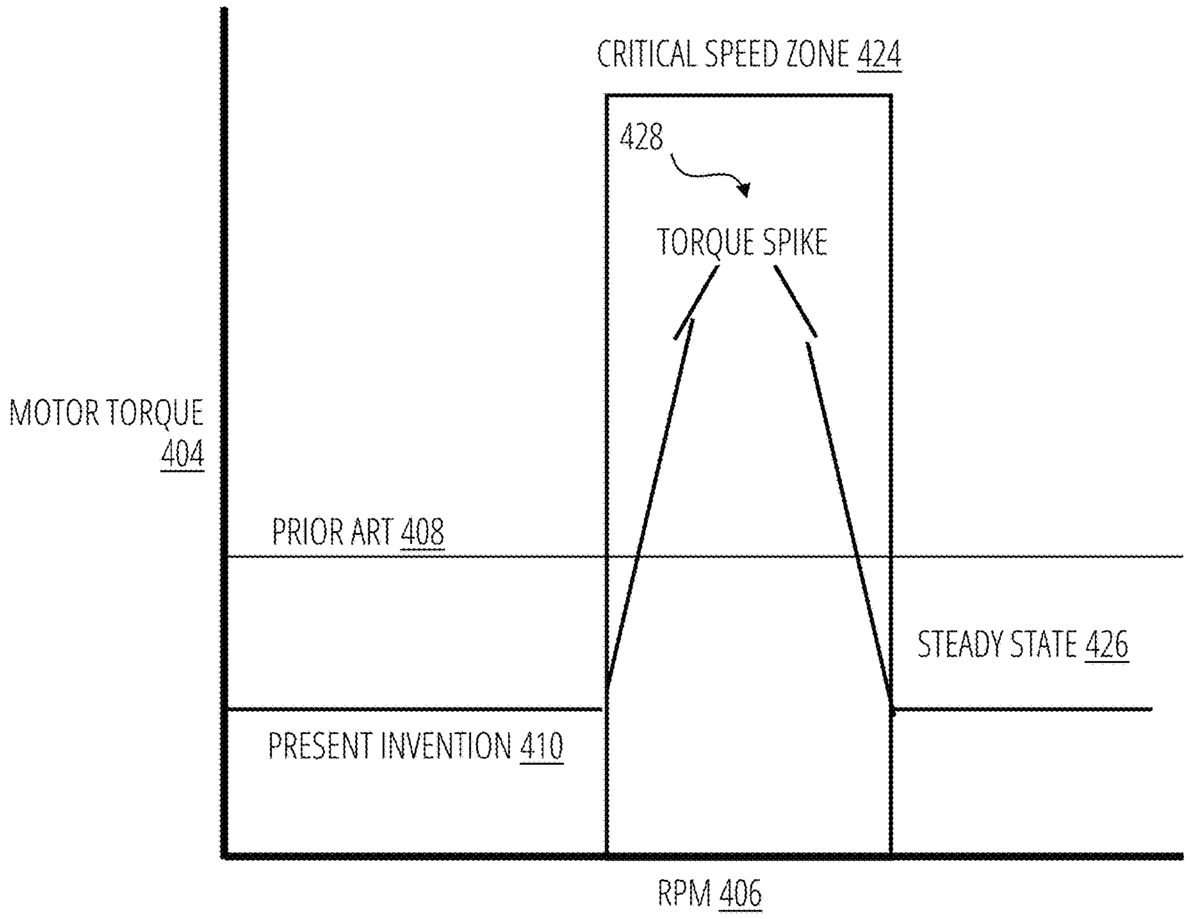
FIG. 4 is a graph comparing the torque profile of a prior art oversized-motor system versus the present invention during run-up, showing the transient torque spike during critical speed traversal.

FIG. 4 shows prior art 408, involving an oversized motor maintaining constant high torque, on an axis depicting motor torque 404 against time. The present invention 410 line shows the present invention maintaining low steady-state motor torque (~50 N·m) with a transient torque spike (428. to ~350 Nm) as the rotational speed (RPM) 406 moves through the critical speed zone 424, reverting to steady state 426 after the RPM 406 traverses the critical speed zone 424. The thinner line for prior art 408 maintains a constant high motor torque (~200 N·m) throughout.

Figure 5:
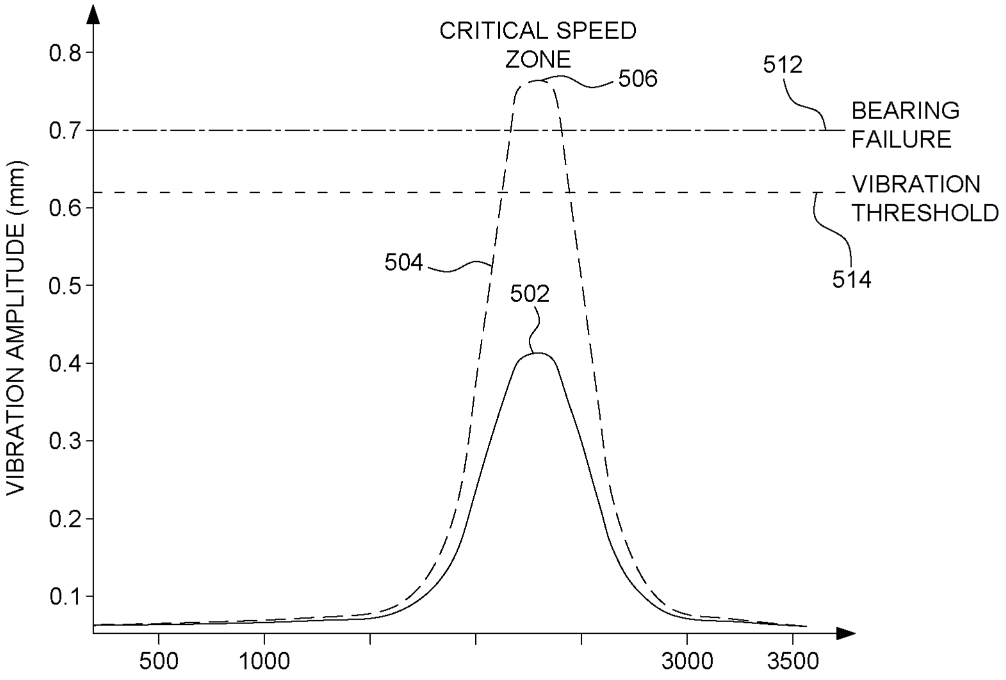
FIG. 5 is a graph showing vibration amplitude versus rotational speed for both slow traversal (prior art) and rapid traversal (present invention).

FIG. 5 is a vibration amplitude comparison. The graph depicts comprises a present-invention 502 line, a prior art 504 line, a critical speed zone 506, a bearing failure 512 threshold, and a vibration threshold 514. A dashed line (prior art, slow traversal) shows amplitude exceeding bearing clearance at resonance. The solid line (present invention, rapid traversal) shows suppressed amplitude staying well below the failure threshold.

Power Switching Architecture

FIG. 6 is a power switching architecture circuit schematic showing an IGBT/MOSFET-based main bus isolation switch 606 and buffer engagement switch 612 with anti-parallel diodes, fuses, current sensing, pre-charge resistor, and the auxiliary energy buffer 114 with ESR representation. The power switching architecture also comprises a variable frequency drive 608, a motor 610, an auxiliary energy buffer 614, a transient torque controller 616, a vibration sensor 618, and an RPM sensor 620. The main bus isolation switch 606 is positioned between the main power bus 210 and the variable frequency drive 110. The buffer engagement switch 612 is positioned between the auxiliary energy buffer 114 and the variable frequency drive 110.

In one embodiment, the switches 606 and 612 comprise solid-state switching devices such as IGBTs or silicon carbide MOSFETs, enabling sub-millisecond switching times. In another embodiment, the switches comprise hybrid devices combining solid-state elements with mechanical contactors for reduced on-state losses. The main bus isolation switch 606 and buffer engagement switch 612 also comprise anti-parallel diodes, fuses, current sensing, and a pre-charge resistor, During resonance transit mode, the transient torque controller 112 opens the main bus isolation switch 606 and closes the buffer engagement switch 612. This isolation prevents current from flowing back into the main bus during the high-current discharge event and ensures that the full output of the auxiliary energy buffer 114 is directed to the motor 610.

In an alternative embodiment, the power switching architecture maintains the main bus isolation switch 606 in a closed position while engaging the auxiliary energy buffer 114, thereby supplementing rather than replacing the main bus power. This configuration may be preferred when the main power source is capable of contributing to the transit torque without risk of overcurrent damage.

Sensors and Detection

The system includes a rotational speed sensor—an RPM sensor 124 (e.g., an encoder, resolver, or Hall-effect sensor) and vibration sensors 116 (e.g., an accelerometer, displacement probe, or velocity transducer). The vibration sensors

116 preferably are mounted on the bearing housing or motor stator 104 to detect radial vibration of the rotor.

The transient torque controller 112 uses these sensors in a dual-mode detection strategy:

RPM-Based Triggering:

In some embodiments, the controller maintains a plurality of stored values representing the critical speed (or speeds) of the rotor, determined during commissioning via modal analysis or empirical testing. When the RPM approaches within a predetermined margin of the critical speed (e.g., 95% of the critical speed), the controller initiates Resonance Transit Mode preemptively, before vibration amplitudes increase.

Vibration-Based Triggering:

As a secondary or backup triggering mechanism, the controller monitors vibration amplitude. If the amplitude exceeds a predetermined threshold (e.g., 50%-80% of the bearing clearance), the controller initiates resonance transit mode regardless of RPM. This provides protection against unexpected resonances or shifts in critical speed due to thermal effects or bearing wear.

Triggering and Resonance Detection

A controller may initiate a resonance traversal mode based on one or more triggering conditions. In some embodiments, the controller uses one or more sensors, including a rotational speed sensor and one or more vibration sensors. In other embodiments, the controller initiates resonance traversal based on estimated parameters derived from motor drive measurements, such as motor current, voltage, torque estimates, rotor position estimates, or other available signals.

Speed-Based Triggering. In some embodiments, the controller stores one or more resonance regions or critical speeds determined during commissioning and/or derived from analysis. The controller may initiate resonance traversal when rotational speed enters or approaches a defined range associated with a resonance region. The defined range may be fixed, may be asymmetric, or may be a function of operating condition such as temperature, load, vacuum level, bearing condition, or other parameters. In one embodiment, the controller is configured to recharge the auxiliary energy buffer from the main power bus after critical rotational speed exceeds the upper bound and before a subsequent traversal of a second critical rotational speed is approached.

Vibration-Based Triggering. In some embodiments, the controller monitors vibration amplitude and initiates resonance traversal when vibration exceeds a threshold. The vibration threshold may be selected based on bearing clearance, expected vibration growth, or other safety criteria. In some embodiments, the controller additionally monitors a rate of change of vibration amplitude and initiates resonance traversal based on a growth-rate threshold.

In some embodiments, the controller stores a plurality of critical rotational speed values corresponding to a plurality of rotor bending modes. The controller is configured to discharge the auxiliary energy buffer selectively during traversal of each of the plurality of critical rotational speeds.

Resonance Risk Metric. In some embodiments, the controller computes a resonance risk metric derived from one or more parameters, including vibration amplitude, vibration growth rate, spectral content of vibration, motor current signatures indicative of mechanical resonance, and/or bearing controller effort. The controller may initiate, shape, or terminate a torque boost profile based on the resonance risk metric.

Fallback and Safety Triggering. In some embodiments, the controller may initiate resonance traversal upon detecting unexpected resonance behavior, including resonance shifts, sensor faults, or deviations from expected vibration response, and may transition to a safe state if one or more safety thresholds are exceeded.

Reconnection, pre-charge, and voltage synchronization for the isolation-switch embodiment In embodiments employing the switched DC-link coupling with primary-path isolation (e.g., FIGS. 2 and 6), the transient torque controller 112 may open the main bus isolation switch 606 during at least a portion of the TRANSIT state while the auxiliary energy buffer 114 supplies the DC link of the variable frequency drive (VFD) 110 through the buffer engagement switch 612. In such embodiments, transitioning from the isolated condition back to normal operation (e.g., RECOVERY/STEADY-STATE) may be performed using an ordered reconnection, pre-charge, and voltage-synchronization procedure to reduce or prevent inrush current, backfeeding toward the main power bus 210, and/or damaging transients across the isolation switch 606.

In some embodiments, upon determining that the rotor has exited a critical speed zone (or that another termination criterion for TRANSIT has been met), the controller 112 initiates a reconnection sequence. The controller may first command the inverter/VFD 110 to a reconnection-safe operating condition, such as (i) limiting motor current, (ii) reducing torque command, and/or (iii) temporarily inhibiting regenerative operation that could elevate DC link voltage while the primary path remains open. In some embodiments, the controller additionally verifies that the buffer engagement switch 612 is controllable and that the auxiliary energy buffer 114 remains within a permitted voltage range for continued DC link support during the reconnection sequence.

In some embodiments, the controller performs voltage synchronization between the DC link and the main DC bus prior to "hard" closure of the isolation switch 606. The controller measures a DC link voltage Vdc (e.g., at the DC link capacitance of the VFD 110) and a bus-side voltage Vbus (e.g., on the main power bus 210 upstream of the isolation switch 606). The controller computes a voltage mismatch ΔV (e.g., $\Delta V = |Vdc - Vbus|$) and compares ΔV to a predetermined reconnection threshold ΔVth. In one embodiment, the controller inhibits hard closure of the isolation switch 606 unless ΔV is less than ΔVth, thereby reducing the energy that would otherwise flow as inrush into the DC link capacitors and/or through the isolation switch at the moment of reconnection.

If ΔV exceeds the predetermined reconnection threshold, the controller may execute a pre-charge step that establishes a limited-current path between the main power bus 210 and the DC link prior to hard closure of the isolation switch 606. In some embodiments, the limited-current path is provided by a pre-charge circuit including a pre-charge resistor (as generally depicted in connection with the power switching architecture of FIG. 6) and a controllable pre-charge switch or contactor, such that bus-to-link current is constrained by the resistor during voltage equalization. In another embodiment, where the isolation switch 606 is implemented as a solid-state switch (e.g., IGBTs or SiC MOSFETs), the controller may implement pre-charge by partially enabling or modulating the solid-state switch to operate in a current-limited manner, thereby providing controlled current flow that reduces the mismatch without a discrete resistor element. In either case, during pre-charge the controller monitors Vdc, Vbus, and a measured pre-charge current, and continues the limited-current pre-charge until ΔV is reduced below ΔVth.

In some embodiments, the controller enforces one or more transient limits during pre-charge and reconnection. Non-limiting examples include: (i) a maximum allowable voltage mismatch for hard closure ($\Delta Vmax$), (ii) a maximum allowable pre-charge current Ipremax, and/or (iii) a maximum allowable current slew rate (dI/dt) max through the isolation switch 606 and/or into the DC link capacitance. The controller may satisfy such limits by selecting a pre-charge resistance value, by commanding a current reference when using controlled current-limited switching, and/or by ramping a gate-drive command (in solid-state embodiments). Where the isolation element includes a mechanical contactor (alone or in a hybrid arrangement), the controller may ensure $\Delta V$ is below $\Delta Vth$ and that measured current is near zero prior to energizing the contactor coil, thereby reducing contact erosion and welding risk.

After the pre-charge step has reduced $\Delta V$ below the reconnection threshold, the controller closes the main bus isolation switch 606 to establish the normal low-impedance connection between the main power bus 210 and the VFD DC link. In embodiments with a discrete pre-charge resistor path, the controller may subsequently bypass the pre-charge resistor (or open the pre-charge path) after hard closure is complete. The controller may then open the buffer engagement switch 612 (if no longer needed) and transition to recovery operation in which the auxiliary energy buffer 114 is recharged subject to the primary power limitation. In some embodiments, the controller performs a "handoff" in which buffer contribution is ramped down while the primary bus contribution is ramped up, thereby avoiding a step change in DC link current.

In some embodiments, additional logic is included to prevent undesirable cross-currents between the auxiliary energy buffer 114 and the main power bus 210 during reconnection. For example, the controller may enforce a non-overlap interval in which the buffer engagement switch 612 is opened (or buffer discharge command is reduced to near zero in regulated embodiments) before hard closure of the isolation switch 606, or alternatively the controller may maintain the buffer engaged while executing pre-charge but limit buffer current such that net current exchange between the bus and buffer remains below a predetermined threshold. In some embodiments, the controller additionally monitors a buffer-side voltage Vbuf and inhibits reconnection if the auxiliary buffer voltage is above the bus-side voltage by more than a predetermined amount, thereby reducing the risk of backfeeding energy toward the main bus during reconnection.

In embodiments where the main power bus 210 is supplied through an input power conversion stage (e.g., a rectifier or an active front end), the controller may coordinate that input stage during isolation and reclose. In one embodiment, while the isolation switch 606 is open the controller commands the input stage into a defined safe state, such as a disabled-gating state or a zero-current/current-limited state, so that the input stage does not attempt to regulate a decoupled DC link. In one embodiment, during reclose the controller keeps the input stage in a current-limited mode while pre-charge is executed and while the isolation switch 606 transitions to the closed state. Following successful reconnection, the controller may ramp the input stage current limit upward (or return to normal DC bus regulation mode) over a predetermined time interval, thereby limiting inrush and ensuring that the primary source is not subjected to a transient overcurrent condition.

In some embodiments, the reconnection sequence includes fallback and fault-handling behavior. For example, if $\Delta V$ does not converge below $\Delta Vth$ within a predetermined timeout, if a measured current exceeds Ipre, max, if (dI/dt) exceeds (dI/dt) max, or if any overvoltage/undervoltage condition is detected on the DC link or buffer, the controller may maintain the isolation switch 606 open, open the buffer engagement switch 612 (or reduce buffer current command), and transition to an emergency or controlled spin-down procedure. In some embodiments, the controller may also command the VFD 110 to limit torque and/or to avoid regenerative operation while isolated, thereby preventing uncontrolled rise of DC link voltage during the fault condition.

Figure 7:
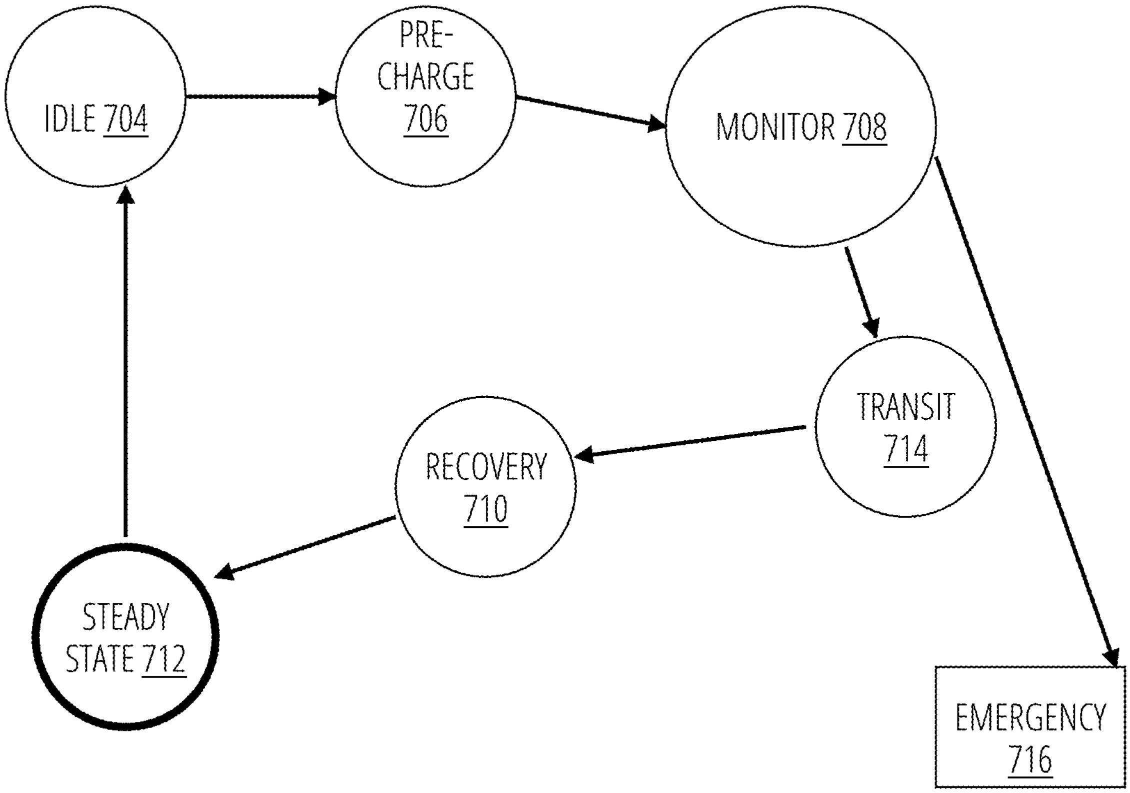
FIG. 7 is a state diagram illustrating the control algorithm for the transient torque controller.

FIG. 7 is a state diagram for the controller showing an idle 704 state, a pre-charge 706 state, a monitor 708 state, a recovery 710 state, a steady state 712, a transit 714 state, and an emergency 716 state.

IDLE State: The system is at rest or operating in steady-state mode. The main bus isolation switch 606 is closed, and the buffer engagement switch 612 is open.

PRE-CHARGE State: Upon initiation of a run-up sequence, the controller charges the auxiliary energy buffer 114 to its full capacity using power from the main power bus 210. The charge rate is limited to avoid overloading the main bus. The system transitions to monitor state when the auxiliary energy buffer 114 reaches a predetermined state of charge (e.g., 95%).

MONITOR State: The controller monitors RPM and vibration while acceleration continues via the main bus. If RPM enters the critical speed zone or vibration exceeds the threshold, the system transitions to TRANSIT state.

TRANSIT State: The controller opens the main bus isolation switch 606 (in the isolation embodiment) and closes the buffer engagement switch 612 The auxiliary energy buffer 114 discharges into the variable frequency drive 110, producing peak motor current. A timer is started. The system transitions to RECOVERY state when: (i) RPM exceeds the upper bound of the critical speed zone, or (ii) vibration amplitude falls below the threshold, or (iii) the timer exceeds a maximum duration (e.g., 10 seconds), whichever occurs first.

RECOVERY State: The controller opens the buffer engagement switch 612 and closes the main bus isolation switch 606. Normal acceleration resumes. The auxiliary energy buffer 114 is recharged for potential subsequent critical speed traversals (e.g., higher-order modes). The system transitions to STEADY-STATE when the rotor reaches operating speed.

STEADY-STATE: Normal charging/discharging operation. The auxiliary energy buffer 114 is maintained at full charge in anticipation of future run-up events.

Transition from idle 704 to pre-charge 706 is triggered by initiation of runup. Transition from pre-charge 706 to monitor 708 is triggered when the auxiliary energy buffer 114 is fully charged. Transition from monitor 708 to transit 714 is triggered by RPM approaching the critical speed zone 424 or when vibration exceeds a threshold. Transition from transit 714 to emergency 716 is triggered when vibration exceeds a pre-set maximum safe level. Transition from transit 714 to recovery 710 is triggered when RPM moves past the critical speed zone 424 or when vibration subsides below the threshold. Transition from recovery 710 to steady state 426 occurs when RPM reaches the prescribed operating level. Transition from recovery 710 to monitor 708 occurs when another critical speed is ahead.

Torque Boost Profiles and Control Objectives

During resonance traversal, the controller may command increased motor torque and/or acceleration relative to a baseline limited by the primary power source. The increased torque may be delivered as a transient profile selected to reduce dwell time in a resonance region and/or to limit vibration growth while maintaining acceptable electrical and mechanical stress.

The controller detects an approach of the rotating body toward a critical speed associated with resonance, by comparing a measured rotational speed to a predetermined critical speed threshold, or by comparing a measured vibration amplitude to a predetermined vibration threshold, In some embodiments, the increased torque is accomplished by a current pulse delivered as a step increase for a predetermined time. In other embodiments, the torque profile comprises a ramp, trapezoid, sequence of pulses, or other shaped profile selected to limit jerk and mechanical stress. In some embodiments, the torque profile is adjusted in real time based on feedback, including vibration amplitude, vibration growth rate, estimated torque, auxiliary energy buffer voltage, and/or other parameters.

In some embodiments, a control objective includes achieving a target dwell time within a resonance region (e.g., less than a predetermined time) and/or limiting a peak vibration amplitude to be below a threshold. In some embodiments, termination of the torque boost occurs upon exiting a defined resonance region, upon a decrease in vibration response, upon reaching a maximum boost duration, or upon reaching a minimum auxiliary energy buffer voltage or state-of-charge threshold.

Injecting of the current pulse from the auxiliary energy buffer 114 is performed such that a dwell time of the rotating body within a resonance region containing the critical speed is less than a predetermined duration calculated to limit vibration amplitude below a bearing clearance threshold.

In some embodiments, injecting the current pulse causes the rotating body to traverse the critical speed in less than two seconds, and the two-second limitation is achieved specifically via the auxiliary energy discharge buffer injection.

Although many embodiments are described in the context of acceleration (run-up), the same principles may be applied during deceleration (spin-down), including by shaping torque to reduce time spent within resonance regions and by routing regenerative energy to recharge the auxiliary energy buffer.

In some embodiments, the system includes pre-charge circuitry configured to limit inrush current when coupling the auxiliary energy buffer to a DC link or other power node. Pre-charge circuitry may include, for example, resistive elements, controlled current sources, and/or controlled switching sequences. In some embodiments, the controller verifies auxiliary energy buffer voltage, state of charge, and/or readiness prior to enabling resonance traversal.

In embodiments using series-connected energy storage elements, balancing circuitry may be employed to maintain voltage distribution within acceptable limits. Protection circuitry may include fuses, circuit breakers, current sensors, voltage sensors, thermal sensors, snubbers, clamps, and/or reverse-current prevention elements. The controller may inhibit boost operation when a fault condition is detected, including overtemperature, overcurrent, undervoltage, sensor fault, or switch fault.

Following a resonance traversal event, the auxiliary energy buffer may be recharged from the primary power source subject to the primary power limitation. In some embodiments, recharge occurs during periods between resonance regions during run-up. In some embodiments, regenerative energy during deceleration is routed to recharge the auxiliary energy buffer, thereby maintaining readiness for subsequent traversal events and reducing net draw from the primary power source.

Controller Implementation

The controller may be implemented using one or more processors, digital signal processors (DSPs), microcontrollers, programmable logic devices (including FPGAs), or other control hardware. The controller may be integrated with the motor drive controller or may be implemented as a separate module in communication with the motor drive.

In some embodiments, control functions described herein are implemented as instructions stored on a non-transitory computer-readable medium and executed by one or more processors. Such instructions may implement detection of resonance traversal conditions, selection of a torque boost profile, control of coupling hardware, management of pre-charge and recharge, and fault handling.

Reconnection, Pre-Charge, and Inrush Management (for Embodiments Using Main-Bus Isolation)

In some embodiments, when the system transitions from the TRANSIT state (in which the main bus isolation switch 606 is open and the buffer engagement switch 612 is closed) to the RECOVERY state, the controller performs an orderly reconnection procedure to re-couple the variable frequency drive (VFD) 110 and its DC link to the main power bus 210 while limiting electrical transients. In one embodiment, the controller measures (i) a DC link voltage Vdc (e.g., via a Vdc sense signal associated with the DC link or inverter input) and (ii) a bus-side voltage Vbus (e.g., a voltage on the main power bus 210 upstream of the isolation switch 606 and/or at an output of an input stage such as a rectifier or active front end). The controller computes a voltage mismatch ΔV between the two nodes (e.g., $\Delta V=|Vdc-Vbus|$) and inhibits "hard" reconnection (full closure of the isolation switch 606) until ΔV is reduced below a predetermined reconnection threshold.

In some embodiments, the reconnection procedure includes a pre-charge step in which the controller establishes a limited-current path between the main power bus 210 and the DC link of the VFD 110 prior to hard closure of the isolation switch 606. In one embodiment, the limited-current path is provided by closing a pre-charge device (e.g., a pre-charge contactor or a controlled solid-state pre-charge switch) that connects the main power bus 210 to the DC link through a pre-charge resistor (as depicted generally by the pre-charge elements associated with the switching architecture of FIG. 6). In another embodiment, the limited-current path is provided by a controlled current source, such as an input-stage power converter operating in a current-limited mode, such that the current into the DC link is regulated to a commanded value. During the pre-charge step, the controller monitors Vdc and Vbus and maintains the limited-current path until ΔV falls below the predetermined reconnection threshold, after which the controller closes the main bus isolation switch 606 to provide the normal low-impedance connection and, if applicable, opens the pre-charge path or bypasses the pre-charge resistor.

In some embodiments, the controller enforces explicit electrical limits during reconnection to protect switching elements, DC link capacitors, and upstream power infrastructure. Non-limiting examples of such limits include: (i) a maximum permitted voltage mismatch ΔVmax for hard closure (e.g., a fixed voltage threshold or a percentage of nominal DC link voltage), (ii) a maximum permitted inrush current Iinrush,max during pre-charge and/or at the moment of hard closure, and (iii) a maximum permitted current slew rate (dI/dt) max as current transitions from the limited-current pre-charge path to the full connection. In embodiments where the isolation switch 606 is implemented using solid-state devices, the controller may enforce (dI/dt) limits by ramping a gate command, modulating a controlled current source, or otherwise shaping current rise. In embodiments where the isolation switch 606 includes a mechanical contactor (alone or in a hybrid arrangement), the controller may enforce ΔVmax and Iinrush, max by completing pre-charge before energizing the contactor coil, thereby reducing contact welding risk and limiting stress on protective devices.

In some embodiments, the controller includes fallback logic if reconnection criteria are not satisfied. For example, if ΔV does not fall below the reconnection threshold within a predetermined timeout, or if measured current or (dI/dt) exceeds a predetermined limit during pre-charge, the controller may (i) maintain the main bus isolation switch 606 in an open state, (ii) open the buffer engagement switch 612 and/or command a reduction of torque to reduce DC link loading, (iii) command the VFD/inverter into a safe state to prevent regenerative overvoltage while isolated, and/or (iv) transition to an emergency spin-down or controlled deceleration sequence. In some embodiments, where regenerative energy may be produced during deceleration while the main bus isolation switch 606 is open, the controller may route regenerative energy into the auxiliary energy buffer 114 (e.g., via a bidirectional DC/DC converter embodiment), or alternatively may dissipate excess energy via a braking chopper or clamp circuit, thereby preventing the DC link voltage from exceeding an overvoltage threshold during the reconnection interval.

Coordination with an Active Front End (AFE) During Isolation and Reconnection

In embodiments employing an active front end 806 (e.g., a controlled rectifier or bidirectional AC/DC stage) supplying a DC link 808, the controller may coordinate AFE operation with isolation and reconnection to further limit transients. In some embodiments, when the main bus isolation switch (or optional isolation switch between the AFE 806 and the DC link 808) is opened for resonance traversal, the controller commands the AFE into a defined isolation mode. In one embodiment, the isolation mode comprises disabling gating signals to the AFE switches (i.e., a non-switching state) and/or commanding the AFE to a zero-current condition such that the AFE does not attempt to regulate the DC link while decoupled. In another embodiment, the controller commands the AFE to a current-limited standby mode in which the AFE remains enabled but is prevented from sourcing substantial current until a reconnection condition is met.

In some embodiments, prior to closing the isolation switch to reconnect the AFE and/or main bus to the DC link, the controller executes a controlled reclose sequence in which switching transitions are coordinated with the DC link voltage mismatch criteria. For example, the controller may (i) disable or hold AFE gating during the instant of mechanical contactor closure (if used), (ii) perform pre-charge via a resistor path or controlled current source until ΔV is below threshold, and then (iii) re-enable the AFE in a current-limited mode such that the AFE gradually resumes supplying current and/or regulating the DC link voltage to its nominal setpoint. In one embodiment, the AFE current limit is ramped from a low value to a normal operating limit over a predetermined time interval to limit inrush and (dI/dt). In some embodiments, after reconnection is complete, the controller transitions the AFE from current-limit mode to a normal DC bus regulation mode (or other normal operating mode), thereby restoring steady-state operation without imposing a transient overload on the primary power source 804.

In embodiments that include a bidirectional DC/DC converter 828 coupling the auxiliary energy buffer 114 to the DC link 808, the controller may further reduce reconnection transients by commanding the DC/DC converter to regulate the DC link voltage toward the bus-side voltage prior to hard closure of the isolation switch. For example, while the isolation switch is open, the controller may command the DC/DC converter to (i) support DC link voltage during traversal and (ii) during recovery, adjust buffer discharge/charge such that Vdc converges toward Vbus, thereby reducing ΔV and the required pre-charge energy. In such embodiments, reconnection may be achieved with reduced inrush, reduced stress on switching elements, and improved compliance with bus-side current and power limitations.

DC/DC-Coupled Auxiliary Energy Buffer Embodiment

FIG. 8 illustrates an embodiment in which an auxiliary energy buffer 114 is coupled to a motor-generator 206 DC link through a bidirectional DC/DC converter 828 to provide controlled charge and discharge of the buffer. The solid lines depict the flow of electrical currents; the lighter lines depict signals and data. The embodiment of FIG. 8 may be used in addition to, or as an alternative to, embodiments in which the auxiliary energy buffer is coupled to the DC link by direct switching.

This embodiment comprises a transient torque controller 112, a motor-generator 206, a primary power source 804, an active front end 806, a DC link 808, an inverter 810, a rotating body 814, a Vdc sense 818, a Vbuf sense 820, an auxiliary energy buffer 824, a pre-charge protection 826, a bidirectional DC/DC converter 828, an RPM sensor 830, a vibration sensor 832, an active front end data link 834, an inverter data link 836, a vibration signal 838, an RPM signal 840, a bidirectional DC/DC controller data link 842, a VDC signal 844, and a Vbuf signal 846.

As shown in FIG. 8, a primary power source 804 supplies power to a motor-generator 206 through an active front end 806. The primary power source 804 may comprise, for example, a utility grid connection, generator set, UPS, or facility DC bus. The active front end 806 may comprise a rectifier and/or other input power conversion circuitry configured to supply a DC link. In some embodiments, the input stage is configured to enforce a limitation on current and/or power drawn from the primary power source (e.g., a continuous current limit, a demand limit, a protective device rating, or a software-imposed limit), such that the system can be sized for steady-state operation at a continuous power limit without requiring the primary power source to support worst-case transient torque requirements.

The active front end 806 is coupled to a DC link 808 comprising a DC link capacitance (e.g., a capacitor bank) that provides local energy storage and stabilizes the DC link voltage. The DC link 808 supplies an inverter 810 or variable frequency drive (VFD) that provides controlled electrical power to a motor-generator 206. The motor-generator 206 is mechanically coupled through a mechanical coupling 850 to a rotating body 814 (e.g., a flywheel rotor), such that torque produced by the motor/generator accelerates and/or decelerates the rotating rotating body 814. An optional isolation switch may be inserted between the active front end 806 and the DC link 808. In embodiments employing the optional isolation switch, the controller may open the isolation switch during at least a portion of a resonance traversal event to inhibit reverse current flow toward the primary power source and/or to decouple the primary power source from rapid transient currents on the DC link. In other embodiments, the isolation switch is omitted and the primary power path remains connected while current drawn from the primary power source is limited by the input stage.

The auxiliary energy buffer 114 may comprise, for example, a supercapacitor bank, a high-rate battery chemistry, a hybrid capacitor-battery system, or another energy storage device capable of delivering transient electrical power. In some embodiments, the auxiliary energy buffer 114 is connected to pre-charge and protection circuitry, which may include one or more of a contactor, fuse, current sensor, voltage sensor, and/or pre-charge elements configured to limit inrush current and provide fault protection. The bidirectional DC/DC converter 828 is configured to regulate energy exchange between the auxiliary energy buffer 114 and the DC link 808, thereby permitting controlled discharge 848 of the auxiliary energy buffer 114 into the DC link 808 during a resonance traversal event and controlled recharge 852 of the auxiliary energy buffer from the DC link 808 during recovery or other conditions.

A transient torque controller 112 (which may be integrated into the VFD controller or implemented as a separate controller) receives one or more sensor signals, such as rotational speed RPM sensor 830, vibration signal 838 for amplitude, DC link voltage (VDC signal 844), auxiliary buffer voltage (Vbuf signal 846), and/or buffer current. Based on such inputs, the controller is configured to (i) detect an approach to or entry into a resonance region (including a critical speed zone), (ii) command a torque and/or acceleration profile to the VFD, and (iii) command operation of the bidirectional DC/DC converter to provide supplemental power from the auxiliary energy buffer to the DC link. In some embodiments, the controller further commands the input stage to limit current drawn from the primary power source during the resonance traversal event, such that supplemental power required for the commanded torque profile is provided at least in part by the auxiliary energy buffer.

In normal run-up operation (outside of resonance traversal), the rotating body 814 is accelerated primarily using power from the primary power source 804 subject to the primary power limitation. During such normal operation, the transient torque controller 112 may maintain the auxiliary energy buffer 114 at a target state of charge, including by charging the auxiliary energy buffer 114 through the bidirectional DC/DC converter 828 at a controlled rate that respects the primary power limitation. In some embodiments, the controller maintains the auxiliary energy buffer at or above a readiness threshold prior to reaching a known resonance region.

Upon detection that the rotating body 814 is within a resonance region, approaching a predetermined critical speed band or resonant frequency, and/or exhibiting vibration indicative of resonance, the controller initiates a resonance traversal mode. During resonance traversal mode, the controller commands a transient increase in motor torque and/or acceleration. Concurrently, the controller commands the bidirectional DC/DC converter to discharge the auxiliary energy buffer and inject controlled current into the DC link, thereby supporting the increased power demand of the VFD and motor/generator. In embodiments without use of the optional isolation switch, the input stage may remain connected and may be controlled to limit current drawn from the primary power source while the auxiliary energy buffer provides additional current into the DC link so that motor current and commanded torque exceed what would otherwise be achievable under the primary power limitation alone. In embodiments using the optional isolation switch, the controller may open the isolation switch during at least a portion of the traversal event such that the auxiliary energy buffer supplies a larger fraction of the DC link power.

In some embodiments, recharging of the auxiliary energy buffer occurs via regenerative braking during subsequent deceleration of the rotating body.

In some embodiments, the controller uses the bidirectional DC/DC converter to regulate DC link voltage during traversal by controlling buffer discharge current as a function of DC link voltage, commanded torque, measured vibration amplitude, and/or a resonance risk metric. The torque boost profile may be terminated or reduced after the rotating body exits the resonance region, after a predetermined maximum boost duration, upon detection that vibration amplitude has decreased below a threshold, or upon a buffer voltage and/or state-of-charge reaching a minimum threshold.

Following a resonance traversal event, the controller enters a recovery mode in which the bidirectional DC/DC converter recharges the auxiliary energy buffer from the DC link at a controlled rate. In some embodiments, the auxiliary energy buffer may additionally be charged using regenerative energy returned by the motor/generator during deceleration or grid export operation, wherein the controller commands the VFD and bidirectional DC/DC converter to route at least a portion of regenerative energy into the auxiliary energy buffer.

The bidirectional DC/DC converter may be implemented using any suitable converter topology, including non-isolated buck, boost, or buck-boost topologies, and/or isolated topologies such as full-bridge or dual-active-bridge arrangements. In some embodiments, the DC/DC converter is interleaved to reduce ripple current and improve dynamic response during rapid discharge and recharge events. By coupling the auxiliary energy buffer through a bidirectional DC/DC converter, the auxiliary buffer voltage range may be decoupled from the DC link voltage range, enabling broader selection of auxiliary energy storage technologies and providing regulated current injection that can reduce switching transients and improve controllability during resonance traversal.

Other Applications

While the foregoing description has focused on flywheel energy storage systems, the principles of the present invention are applicable to other rotating machinery that must traverse critical speeds, including: centrifuges used in industrial or medical applications, turbomachinery such as compressors and turbines, gyroscopes and reaction wheels for spacecraft attitude control, and high-speed spindles for machine tools. In each case, the auxiliary energy buffer provides a transient power boost to accelerate through resonance zones without requiring oversized motors or power supplies.

Relationship Among Embodiments

The foregoing detailed description presents multiple embodiments of the disclosed system and method, which may differ from one another in the degree of specificity with which particular components are defined. It will be understood that these embodiments are not mutually exclusive and that features described in connection with one embodiment may be combined with or substituted for features described in connection with another embodiment, except where such combination would be structurally or functionally inconsistent.

In a first set of embodiments, the system employs a specific power switching architecture comprising a main bus isolation switch positioned between the main power bus and the variable frequency drive, and a buffer engagement switch positioned between the auxiliary energy buffer and the variable frequency drive. In these embodiments, the auxiliary energy buffer may comprise any of the energy storage technologies described herein-including without limitation a supercapacitor bank, a capacitor bank, a high-rate battery chemistry such as lithium titanate or lithium iron phosphate, a hybrid capacitor-battery system, or another energy storage technology capable of providing transient electrical power- and a transient torque controller comprising a memory storing a critical speed zone coordinates the opening and closing of the main bus isolation switch and the buffer engagement switch in response to measured or estimated rotational speed. In these embodiments, the auxiliary energy buffer has a second maximum current rating that is at least twice a first maximum current rating of the main power bus. These embodiments are described, for example, in connection with FIGS. 2 and 6, and correspond to the architecture in which the controller opens the main bus isolation switch and closes the buffer engagement switch when the rotational speed of the flywheel rotor is within a predetermined range encompassing a critical rotational speed, and closes the main bus isolation switch and opens the buffer engagement switch after the rotational speed exceeds an upper bound of the predetermined range.

In a second set of embodiments, the system employs a supercapacitor bank as the auxiliary energy source and a switching arrangement that selectively couples the supercapacitor bank to a DC link of the variable frequency drive and selectively isolates the main power bus from the DC link. The term "switching arrangement" as used herein encompasses, but is not limited to, the specific combination of a main bus isolation switch and a buffer engagement switch described in connection with the first set of embodiments; the switching arrangement may alternatively comprise a single multi-port switching device, a combination of solid-state and mechanical switching elements arranged in any suitable topology, a bidirectional DC/DC converter stage providing controlled coupling and decoupling, or any other controllable electrical arrangement capable of selectively coupling the supercapacitor bank to the DC link and selectively isolating the main power bus from the DC link. In these embodiments, the supercapacitor bank has a second current capacity that is at least three times a first current capacity of the main power bus, and the motor-generator has a thermal time constant greater than an expected traversal duration through a resonance region associated with a critical rotational speed. A controller-which may be implemented as the transient torque controller described in connection with the first set of embodiments or as any other controller suitable for performing the described functions—is configured to maintain the supercapacitor bank at or above a predetermined state of charge prior to the flywheel rotor entering the resonance region, to actuate the switching arrangement based on inputs from a rotational speed sensor and a vibration sensor, to command the variable frequency drive to deliver motor current exceeding the first current capacity, and to recharge the supercapacitor bank following traversal using power from the main power bus and/or regenerative energy.

Accordingly, it will be appreciated that the first set of embodiments and the second set of embodiments reflect different combinations of broader and narrower features directed to the same inventive concept of traversing a critical rotational speed by temporarily supplementing motor drive power from an auxiliary energy source. In the first set of embodiments, the energy storage technology is described broadly as an auxiliary energy buffer encompassing multiple storage chemistries and configurations, while the switching architecture is described with specificity as comprising discrete main bus isolation and buffer engagement switches. In the second set of embodiments, the energy storage technology is described with specificity as a supercapacitor bank, while the switching architecture is described broadly as a switching arrangement encompassing multiple possible topologies. Similarly, the controller in the first set of embodiments is described as a transient torque controller comprising a memory storing a critical speed zone, while the controller in the second set of embodiments is described more broadly and additionally incorporates sensor-based triggering from both rotational speed and vibration sensors, pre-charge management, and regenerative recharge as integral controller functions. These variations in the scope of individual elements reflect distinct embodiments of the invention, each of which is independently disclosed and supported by the foregoing description.

It will further be understood that the boost ratio—i.e., the ratio of the current capacity or maximum current rating of the auxiliary energy source to that of the main power bus—may vary among embodiments. In some embodiments, the auxiliary energy source has a maximum discharge current rating or current capacity that is at least twice the maximum current rating or current capacity of the main power bus. In other embodiments, the auxiliary energy source has a current capacity that is at least three times, or between three and ten times, the current capacity of the main power bus. The selection of a particular boost ratio depends on system-specific parameters including resonance region width, rotor inertia, expected resonance drag torque, motor efficiency, and desired dwell time, as described in the worked example herein. The use of different minimum boost ratios in different embodiments reflects engineering trade-offs among buffer size, cost, weight, and transient torque capability, and does not imply that embodiments specifying a higher minimum ratio exclude lower ratios within the specified range.

It should be understood that the power coupling and control architectures described herein may be implemented according to varying degrees of structural specificity, corresponding to different embodiments of the invention. For example, in some embodiments, the system is defined by a specific switching topology comprising a discrete "main bus isolation switch" and a "buffer engagement switch". In this specific implementation, the controller is configured to actuate these distinct physical or logical switches to isolate the primary power source and engage the auxiliary energy buffer, respectively. This embodiment strictly defines the hardware path used to decouple the main power bus 210 from the variable frequency drive 110 during the resonance traversal event. In other embodiments, a first switch controls current from the main power source, while a second switch controls current from the auxiliary energy buffer.

In contrast, other embodiments of the present disclosure utilize a broader functional definition referred to as a "switching arrangement". The term "switching arrangement" is intended to encompass the specific dual-switch topology described above, but also broadly includes any circuit configuration capable of selectively coupling the auxiliary energy buffer to the DC link and selectively isolating the main power bus. This may include integrated power routing matrices, bidirectional DC/DC converters functioning as regulation switches, or hybrid electromechanical and solid-state assemblies. Therefore, while the "main bus isolation switch" and "buffer engagement switch" represent a preferred structural realization, the "switching arrangement" represents a broader functional embodiment that may be satisfied by alternative circuit topologies that achieve the same result of transient torque injection and primary source isolation.

Furthermore, distinction should be drawn regarding the energy storage medium. While general embodiments of the invention may utilize a generic "auxiliary energy buffer" comprising various chemistries such as batteries or flywheels, other specific embodiments-such as those described in the twenty-first claim aspect-explicitly recite a "supercapacitor bank." This specific embodiment is optimized for applications where the thermal time constant of the motor and the required current capacity (e.g., three times the main bus capacity) necessitate the ultra-high power density and rapid cycle capability unique to supercapacitors, as opposed to the broader range of storage media permissible in other embodiments. Thus, the disclosure contemplates both a broad system utilizing generic buffers and discrete switches, and a high-performance embodiment specifically utilizing supercapacitors controlled by a generalized switching arrangement.

I claim:

1. A kinetic energy storage system configured to traverse at least one critical rotational speed, comprising:
- a flywheel rotor having a mass and a stiffness defining at least one critical rotational speed;
- an electric motor-generator coupled to said flywheel rotor;
- a variable frequency drive electrically connected to said electric motor-generator;
- a main power bus configured to supply electrical current to said variable frequency drive subject to a first maximum current rating;
- an auxiliary energy buffer configured to store electrical energy and to discharge said energy at a second maximum current rating, wherein said second maximum current rating is at least twice said first maximum current rating;
- a main bus isolation switch positioned between said main power bus and said variable frequency drive;
- a buffer engagement switch positioned between said auxiliary energy buffer and said variable frequency drive; and
- a transient torque controller comprising a memory storing at least one of a plurality of critical speed zones, configured to: (i) open said main bus isolation switch and close said buffer engagement switch when a rotational speed of said flywheel rotor is within a predetermined range encompassing said at least one critical rotational speed, thereby causing said auxiliary energy buffer to discharge current into said variable frequency drive; and (ii) close said main bus isolation switch and open said buffer engagement switch after the rotational speed of said flywheel rotor exceeds an upper bound of said predetermined range.

2. The system of claim 1, wherein said auxiliary energy buffer comprises a supercapacitor bank.

3. The system of claim 1, wherein said auxiliary energy buffer comprises lithium titanate battery cells.

4. The system of claim 1, wherein said auxiliary energy buffer comprises a hybrid storage system including both supercapacitors and battery cells.

5. The system of claim 1, wherein said second maximum current rating is between three and ten times said first maximum current rating.

6. The system of claim 1, further comprising a vibration sensor mounted to detect radial vibration of said flywheel rotor, wherein said transient torque controller is further configured to trigger opening of said main bus isolation switch and closing of said buffer engagement switch when a vibration amplitude measured by said vibration sensor exceeds a predetermined vibration threshold, said predetermined vibration threshold being less than 80% of a bearing clearance of said flywheel rotor.

7. The system of claim 1, wherein said motor-generator has a thermal time constant of at least 15 seconds, such that said motor-generator can sustain a current equal to said second maximum current rating for at least 2 seconds without exceeding a rated winding temperature.

8. The system of claim 1, wherein said transient torque controller is further configured to recharge said auxiliary energy buffer from said main power bus after said critical rotational speed exceeds said upper bound and before a subsequent traversal of a second critical rotational speed.

9. The system of claim 1, wherein said transient torque controller stores a plurality of critical rotational speed values corresponding to a plurality of rotor bending modes, and wherein said controller is configured to discharge said auxiliary energy buffer selectively during traversal of each of said plurality of critical rotational speeds.

10. The system of claim 1, wherein said variable frequency drive comprises an inverter rated for pulsed operation at 150% of a continuous current rating for durations up to 10 seconds.

11. The system of claim 1, wherein said main bus isolation switch and said buffer engagement switch each comprise solid-state switching devices having switching times of less than 1 millisecond.

12. The system of claim 1, wherein said transient torque controller is further configured to recharge said auxiliary energy buffer via regenerative braking during deceleration of said flywheel rotor.

13. The system of claim 1, wherein said transient torque controller implements a state machine comprising: an IDLE state; a PRE-CHARGE state in which said auxiliary energy buffer is charged; a MONITOR state in which said rotational speed and vibration are monitored; a TRANSIT state in which said buffer engagement switch is closed and said main bus isolation switch is open; and a RECOVERY state in which said main bus isolation switch is closed and said buffer engagement switch is open.

14. The system of claim 1, wherein said transient torque controller is further configured to close said main bus isolation switch if a voltage of said auxiliary energy buffer falls below a minimum threshold during said discharge, thereby supplementing power from said main power bus.

15. A method for accelerating a rotating body through a resonant frequency, comprising:
- accelerating the rotating body using power from a primary power source connected via a primary power path, said primary power source having a continuous power limit;
- detecting an approach of said rotating body toward a critical speed associated with resonance, wherein said detecting comprises at least one of: comparing a measured rotational speed to a predetermined critical speed threshold, or comparing a measured vibration amplitude to a predetermined vibration threshold;
- wherein said predetermined speed threshold and said predetermined vibration threshold are computed from the physical properties of the rotating body;

responsive to said detecting, isolating said primary power path by opening a first switch between said primary power source and a motor-generator driving said rotating body;

engaging an auxiliary energy buffer by closing a second switch between said auxiliary energy buffer and said motor-generator;

injecting a current pulse from said auxiliary energy buffer into said motor-generator, wherein a magnitude of said current pulse exceeds a current equivalent of said continuous power limit of said primary power source; and reconnecting said primary power path and disengaging said auxiliary energy buffer once said rotating body has accelerated beyond said critical speed;

wherein said injecting is performed such that a dwell time of said rotating body within a resonance region containing said critical speed is less than a predetermined duration calculated to limit vibration amplitude below a bearing clearance threshold.

16. The method of claim 15, further comprising pre-charging said auxiliary energy buffer to a predetermined state of charge prior to said rotating body reaching said critical speed.

17. The method of claim 15, wherein said injecting causes said rotating body to traverse said critical speed in less than 2 seconds; and wherein the two-second limitation is achieved specifically via the auxiliary energy buffer injection.

18. The method of claim 15, further comprising recharging said auxiliary energy buffer via regenerative braking during subsequent deceleration of said rotating body.

19. A method for accelerating a rotating body through a resonant frequency, comprising:

accelerating the rotating body using power from a primary power source having a continuous power limit;

detecting an approach of said rotating body toward a critical speed associated with resonance;

responsive to said detecting, supplementing said primary power source by engaging an auxiliary energy buffer in parallel with said primary power source, wherein a combined current from said primary power source and said auxiliary energy buffer exceeds said continuous power limit of said primary power source alone; and disengaging said auxiliary energy buffer once said rotating body has accelerated beyond said critical speed;

wherein said injecting is performed such that a dwell time of said rotating body within a resonance region containing said critical speed is less than a predetermined duration calculated to limit vibration amplitude below a bearing clearance threshold.

20. The method of claim 19, wherein said auxiliary energy buffer comprises supercapacitors and said supplementing comprises discharging a majority of stored energy in less than 10 seconds.

21. A kinetic energy storage system configured to traverse at least one critical rotational speed, comprising:

a flywheel rotor having at least one critical rotational speed;

a motor-generator coupled to said flywheel rotor, said motor-generator having a thermal time constant greater than an expected traversal duration through a resonance region associated with said at least one critical rotational speed;

a variable frequency drive electrically connected to said motor-generator and including a DC link;

a main power bus coupled to said DC link and having a first current capacity defining a primary power limitation;

a supercapacitor bank having a second current capacity at least three times said first current capacity, said supercapacitor bank configured to discharge into said DC link;

a switching arrangement configured to couple said supercapacitor bank to said DC link selectively and to isolate said main power bus from said DC link selectively;

a rotational speed sensor configured to measure rotational speed of said flywheel rotor;

a vibration sensor configured to measure vibration amplitude of said flywheel rotor; and a transient torque controller configured to:

(i) maintain said supercapacitor bank at or above a predetermined state of charge prior to said flywheel rotor entering said resonance region;

(ii) actuate said switching arrangement to couple said supercapacitor bank to said DC link and to isolate said main power bus from said DC link when at least one of: (a) said rotational speed sensor indicates a speed within a predetermined range encompassing said at least one critical rotational speed, or (b) said vibration sensor indicates an amplitude exceeding a predetermined vibration threshold, said predetermined vibration threshold being less than a bearing clearance of said flywheel rotor;

(iii) command said variable frequency drive to deliver motor current exceeding said first current capacity such that said flywheel rotor traverses said resonance region with a dwell time less than a duration at which vibration amplitude would reach said bearing clearance; and (iv) recharge said supercapacitor bank following traversal of said resonance region using at least one of power from said main power bus or regenerative energy from said motor-generator during deceleration of said flywheel rotor.

* * * * *